United States Patent
Shields et al.

(10) Patent No.: US 11,479,682 B2
(45) Date of Patent: Oct. 25, 2022

(54) THREE-DIMENSIONAL PRINTING

(71) Applicant: HEWLETT-PACKARD DEVELOPMENT COMPANY, L.P., Spring, TX (US)

(72) Inventors: James P. Shields, Corvallis, OR (US); Paul J. Bruinsma, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 16/605,437

(22) PCT Filed: Jul. 26, 2018

(86) PCT No.: PCT/US2018/043886
§ 371 (c)(1),
(2) Date: Oct. 15, 2019

(87) PCT Pub. No.: WO2020/023041
PCT Pub. Date: Jan. 30, 2020

(65) Prior Publication Data
US 2021/0324216 A1    Oct. 21, 2021

(51) Int. Cl.
| | |
|---|---|
| *B33Y 10/00* | (2015.01) |
| *B29C 64/40* | (2017.01) |
| *B29C 64/165* | (2017.01) |
| *B22F 10/14* | (2021.01) |
| *B22F 10/47* | (2021.01) |
| *B22F 10/43* | (2021.01) |
| *B33Y 40/20* | (2020.01) |
| *C09D 7/40* | (2018.01) |

(Continued)

(52) U.S. Cl.
CPC .............. *C09D 7/66* (2018.01); *B22F 10/14* (2021.01); *B22F 10/43* (2021.01); *B22F 10/47* (2021.01); *B29C 64/165* (2017.08); *B29C 64/40* (2017.08); *B33Y 10/00* (2014.12); *B33Y 40/20* (2020.01); *B33Y 80/00* (2014.12); *C09D 5/022* (2013.01); *C09D 5/028* (2013.01)

(58) Field of Classification Search
CPC .......... B22F 10/14; B22F 10/47; B22F 10/43; C09D 7/66; C09D 5/022; C09D 5/028; B33Y 10/00; B33Y 40/20; B29C 64/40; B29C 64/165
See application file for complete search history.

(56) References Cited

U.S. PATENT DOCUMENTS

| | | | |
|---|---|---|---|
| 9,643,281 B1 | 5/2017 | Memmen et al. | |
| 9,833,839 B2 | 12/2017 | Gibson et al. | |

(Continued)

FOREIGN PATENT DOCUMENTS

| | | |
|---|---|---|
| WO | WO2015190037 A1 | 12/2015 |
| WO | WO2017180314 A8 | 11/2018 |

*Primary Examiner* — Michael P Wieczorek
(74) *Attorney, Agent, or Firm* — Dierker & Kavanaugh PC

(57) ABSTRACT

In an example, a three-dimensional (3D) printing kit includes a metallic build material composition; a binding agent; and a release agent for patterning a breakable connection. The binding agent includes a first latex binder. The release agent includes a white colorant including a white metal oxide pigment coated with a coating selected from the group consisting of alumina, silica, and combinations thereof; boehmite particles; a second latex binder; and an aqueous vehicle.

10 Claims, 8 Drawing Sheets

(51) Int. Cl.
 *B33Y 80/00* (2015.01)
 *C09D 5/02* (2006.01)

(56) References Cited

U.S. PATENT DOCUMENTS

| | | |
|---|---|---|
| 2015/0273582 A1 | 10/2015 | Crump et al. |
| 2017/0182560 A1 | 6/2017 | Myerberg et al. |
| 2017/0297106 A1* | 10/2017 | Myerberg .............. B33Y 40/00 |
| 2017/0349770 A1 | 12/2017 | Jung et al. |
| 2018/0015664 A1 | 1/2018 | Kabalnov et al. |
| 2018/0022923 A1 | 1/2018 | Emamjomeh et al. |
| 2018/0086933 A1* | 3/2018 | Kasperchik .......... C09D 11/106 |

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
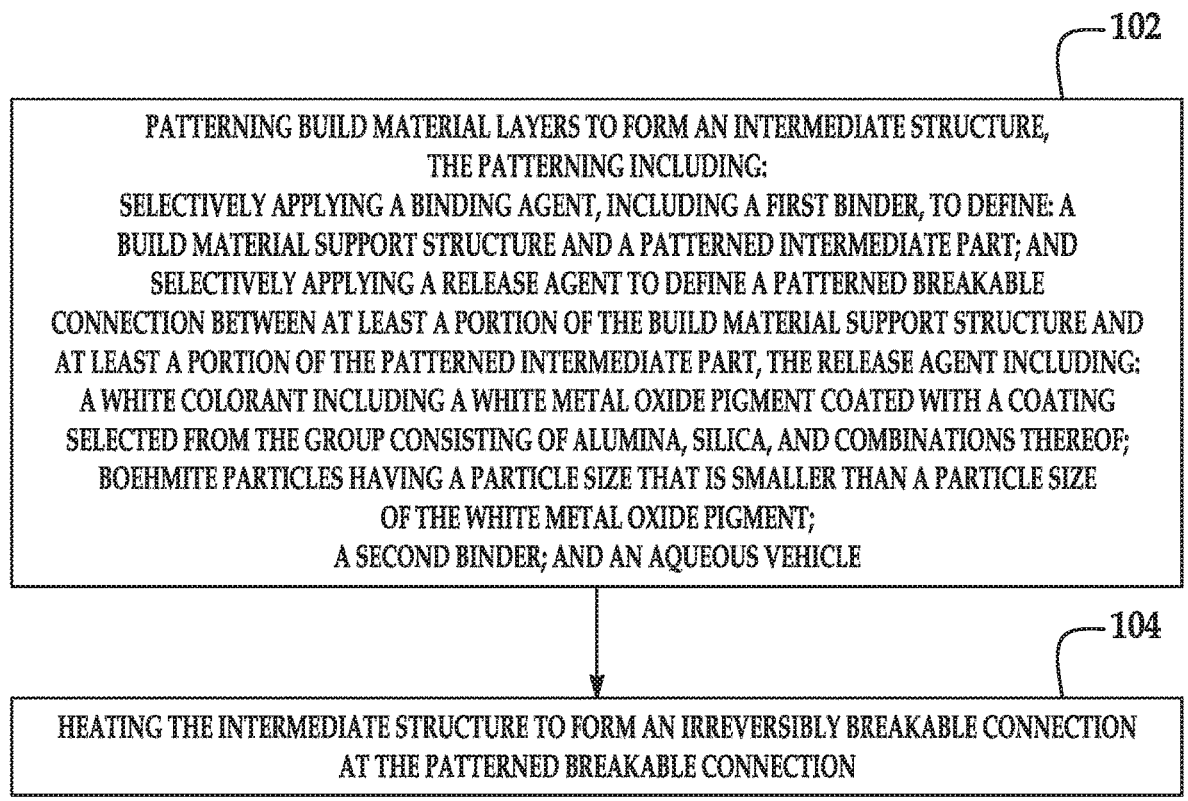
FIG. 1 is a flow diagram illustrating an example of a 3D printing method disclosed herein.

In some examples of three-dimensional (3D) printing, a liquid functional agent is selectively applied to a layer of build material on a build platform to pattern a selected region of the layer, and then another layer of the build material is applied thereon. The liquid functional agent may be applied to this other layer of build material, and these processes may be repeated to form a green part (also known as a green body, and referred to herein as a patterned intermediate part) of the 3D part that is ultimately to be formed. The liquid functional agent is capable of penetrating the layer of build material onto which it is applied, and spreading onto the exterior surface of the build material particles of that layer. The liquid functional agent may include a binder that holds the build material particles of the patterned intermediate part together; and thus may be referred to as a binding liquid functional agent or binding agent. The patterned intermediate part may then be exposed to heat to sinter the build material in the patterned intermediate part to form the 3D object/part.

In some 3D printing methods, sections of a patterned intermediate part may not directly be supported by the build platform during the patterning process, and/or may not be supported by a heating mechanism platform during the sintering process. A lack of support can lead to deformation of those sections during patterning and/or sintering. The lack of support may be undesirable because it may render the final finished part otherwise unusable, aesthetically unpleasing, etc. In the examples disclosed herein, a build material support structure is built as the patterned intermediate part is built, which provides support to the patterned intermediate part during patterning. Also in the examples disclosed herein, the build material support structure is temporarily bound to the patterned intermediate part at a patterned breakable connection, and thus can be moved to a heating mechanism platform with the patterned intermediate part to provide support during sintering.

As mentioned, the build material support structure is temporarily bound to the patterned intermediate part at the patterned breakable connection, which is patterned with a release agent rather than a binding agent. In the examples disclosed herein, the release agent includes white colorant and boehmite particles. During sintering, the white colorant and boehmite particles of the patterned breakable connection provide a physical barrier to the coalescence of the metallic build material particles at the patterned breakable connection. As such, the patterned breakable connection forms an irreversibly breakable connection which contains non-contiguous metallic build material particles, and white colorant and boehmite particles among the non-contiguous metallic build material particles. The non-contiguity of the irreversibly breakable connection increases its fragility, which allows the 3D support structure to be easily removed from the 3D object at the irreversibly breakable connection.

Definitions

Throughout this disclosure, it is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

As used herein, the terms "remaining region of the patterned intermediate part," "portion of the patterned intermediate part," or "layer of the patterned intermediate part" refers to a subsection of the intermediate part that does not have a shape representative of the final 3D printed part, and that includes build material particles patterned with a binding agent. In the remaining portion, the portion, or the layer of the patterned intermediate part, the build material particles may or may not be weakly bound together by one or more components of the binding liquid functional agent and/or by attractive force(s) between the build material particles and the binding agent. Moreover, it is to be understood that any build material that is not patterned with the binding agent is not considered to be part of the portion of the patterned intermediate part, even if it is adjacent to or surrounds the portion of the patterned intermediate part.

As used herein, the term "patterned intermediate part" refers to an intermediate part that has a shape representative of the final 3D printed part, and that includes build material particles patterned with the binding agent. In the patterned intermediate part, the build material particles may or may not be weakly bound together by one or more components of the binding agent and/or by attractive force(s) between the build material particles and the binding agent. In some instances, the mechanical strength of the patterned intermediate part is such that it cannot be handled or extracted from a build platform. Moreover, it is to be understood that any build material that is not patterned with the binding agent is not considered to be part of the patterned intermediate part, even if it is adjacent to or surrounds the patterned intermediate part.

As used herein, the term "build material support structure" refers to at least one layer of build material that is patterned with the binding agent and that provides support for i) an additional layer of build material that is patterned with the release agent, ii) additional layer(s) of build material that are patterned with the binding agent, and/or iii) patterned layers during sintering.

Also as used herein, a "patterned breakable connection" refers to a layer of build material patterned with the release agent and positioned between at least a portion of the build material support structure and at least a portion of the patterned intermediate part.

As used herein, the term "intermediate structure" includes the patterned intermediate part and the build material support structure temporarily bound together by the patterned breakable connection.

As used herein, the term "densified intermediate part" refers to a patterned intermediate part from which the liquid components of the binding agent have at least substantially evaporated. At least substantial evaporation of the liquid components of the binding agent leads to densification of the intermediate part, which may be due to capillary compaction. The at least substantial evaporation of the binding agent may also allow the binder to bind the build material particles of the densified intermediate part. In other words, the "densified intermediate part" is an intermediate part with a shape representative of the final 3D printed part and that includes the build material particles bound together by the binder. Compared to the patterned intermediate part, the mechanical strength of the densified intermediate part is greater, and the densified intermediate part can be handled or extracted from the build area platform.

The patterned or densified intermediate part may be known as a green part, but it is to be understood that the term "green" when referring to the patterned intermediate/green part or the densified intermediate/green part does not connote color, but rather indicates that the part is not yet fully processed.

As used herein, the term "at least substantially binder-free intermediate part" refers to an intermediate part that has been exposed to a heating process that initiates thermal decomposition of the binder so that the temporary binder is at least partially removed. In some instances, volatile organic components of, or produced by the thermally decomposed binder are completely removed and a very small amount of non-volatile residue from the thermally decomposed binders may remain. The small amount of the non-volatile residue is generally <2 wt % of the initial binder amount, and in some instances is <0.1 wt % of the initial binder amount. In other instances, the thermally decomposed binder (including any products and residues) is completely removed. In other words, the "at least substantially binder-free intermediate part" refers to an intermediate part with a shape representative of the final 3D printed part and that includes build material particles bound together as a result of i) weak sintering (i.e., low level necking between the particles, which is able to preserve the part shape), or ii) a small amount of the non-volatile binder residue remaining, and/or iii) a combination of i and ii.

The at least substantially binder-free intermediate part may have porosity similar to or greater than the densified intermediate part (due to temporary binder removal), but the porosity is at least substantially eliminated during the transition to the 3D printed part/object.

The at least substantially binder-free intermediate part may be known as a gray part, but it is to be understood that the term "gray" when referring to the at least substantially binder-free gray part does not connote color, but rather indicates that the part is not yet fully processed.

As used herein, the terms "3D printed part or object," "3D part," and "3D object" refer to a completed, sintered part.

As used herein, the "release agent" refers to a liquid functional agent that includes a white colorant and boehmite particles. The white colorant includes a metal oxide pigment that is coated with alumina and/or silica. The white colorant and the boehmite remain at least substantially intact when exposed to the heating temperatures disclosed herein. By "at least substantially intact," it is meant that the white colorant and/or the boehmite do/does not melt, fuse, coalesce, or otherwise agglomerate in a mechanically significant way when exposed to the heating temperature(s) disclosed herein. Examples of the release agent are described further herein below.

Also as used herein, the "binding agent" refers to a patterning fluid that includes a binder, but that does not include the white colorant or the boehmite. Examples of the binding agent are described further herein below.

It is to be understood that the weight percentages provided herein may vary, depending upon the weight percentage of the active components within a solution, dispersion, etc. used to form the binding agent, release agent, etc., and also on the desired weight percentage of the active components within the binding agent, release agent, etc. For example, if a dispersion (to be added to the binding agent) includes 10% of the active component, and the target weight percentage of the active component in the binding agent is 0.01%, then the amount of the dispersion that is added is 0.1% to account for the non-active components in the dispersion.

The examples disclosed herein provide several methods for forming the intermediate structure, and the final sintered object, support, and connection. These methods utilize similar build materials, release agents, and binding agents. Each of the components will now be described.

Build Material

In examples of the method disclosed herein, the same build material may be used for generating the 3D part, the support structure, and the irreversibly breakable connection. The build material can include metallic build material.

In an example, the build material particles are a single phase metallic material composed of one element. In this example, the sintering temperature may be below the melting point of the single element.

In another example, the build material particles are composed of two or more elements, which may be in the form of a single phase metallic alloy or a multiple phase metallic alloy. In these other examples, sintering generally occurs over a range of temperatures.

The build material particles may be composed of a single element or alloys. Some examples of the metallic build material particles include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, copper (Cu) and alloys thereof, zirconium (Zr) and alloys thereof. Some specific examples include AlSi10Mg, 2xxx series aluminum, 4xxx series aluminum, CoCr MP1, CoCr SP2, Maraging-Steel MS1, Hastelloy C, Hastelloy X, NickelAlloy HX, Inconel IN625, Inconel IN718, SS GP1, SS 17-4PH, SS 316L, SS 430L, Ti6Al4V, and Ti-6Al-4V ELI7. While several example alloys have been provided, it is to be understood that other alloys may be used.

The temperature(s) at which the metallic particles sinter is/are above the temperature of the environment in which the patterning portion of the 3D printing method is performed (e.g., above 100° C.). In some examples, the metallic build material particles may have a melting point ranging from about 500° C. to about 1900° C. In other examples, the metallic build material particles may be an alloy having a range of melting points.

The build material particles may be similarly sized particles or differently sized particles. The individual particle size of each of the build material particles is up to 100 µm. In an example, the build material particles may be particles, having a particle size ranging from about 1 µm to about 100 µm. In another example, the individual particle size of the build material particles ranges from about 1 µm to about 30 µm. In still another example, the individual particle size of the build material particles ranges from about 2 µm to about 50 µm. In yet another example, the individual particle size of the build material particles ranges from about 5 µm to about 15 µm. In yet another example, the individual particle size of the build material particles ranges from about 3.25 µm to about 5 µm. In yet another example, the individual particle size of the build material particles is about 10 µm. As used herein, the term "individual particle size" refers to the particle size of each individual build material particle. As such, when the build material particles have an individual particle size ranging from about 1 µm to about 100 µm, the particle size of each individual build material particle is within the disclosed range, although individual build material particles may have particle sizes that are different than the particle size of other individual build material particles. In other words, the particle size distribution may be within the given range. The particle size of the build material particles generally refers to the diameter or volume weighted average/mean diameter of the build material particle, which may vary, depending upon the morphology of the particle. The build material particles may also be non-spherical, spherical, random shapes, or combinations thereof.

Release Agent

The release agent may be used to pattern build material where it is desirable to form the irreversibly breakable connection.

The release agent disclosed herein is an aqueous (i.e., water) based liquid including the white colorant, boehmite, a polymeric dispersant, and a latex binder. This combination does not stop gravitational settling of the particles, but rather, provides conditions where a loose flocculated mass of colorant and boehmite are formed that can be easily resuspended with minor agitation or shaking. It has been found that by milling the white colorant (i.e., alumina and/or silica coated white metal oxide pigment) with the polymeric dispersant, and by adding the boehmite particles, the various particles form flocs or flocculated masses that allow for a more controlled destabilization of the pigment in the aqueous vehicle of the release agent. By allowing sedimentation of the weakly associated colloid particles to occur (as loose flocs or flocculated masses), a fluffy sediment of low density is formed that can be easily resuspended without permanent clogging of the inkjet printhead and/or fluid channels. Thus, when settling, more benign flocculated masses of white metal oxide pigment form (rather than tightly packed pigment that is unrecoverable) on cloud-like flocculates of the boehmite. This enables the release agent to be readily redispersed, which leads to reliable jettability.

The white colorant disclosed herein includes a white metal oxide pigment coated with a coating selected from the group consisting of alumina, silica, and combinations thereof. As such, the white colorant is a coated pigment.

The white metal oxide pigment of the white colorant has an average particulate size (i.e., particle size) ranging from about 100 nm to 600 nm. Examples of the white metal oxide pigment can include titanium dioxide particles, zinc oxide particles, zirconium oxide particles, or combinations thereof.

The coating on the white metal oxide pigment is alumina, silica, or combinations thereof. In coatings including combinations of alumina and silica, any weight ratio of alumina to silica may be used. In an example, the coating may include from 2 wt % to about 20 wt % of alumina and a remainder of silica, or may include from 2 wt % to about 20 wt % of silica and a remainder of alumina. The coating may be coated on the white metal oxide pigment as part of a method of making the release agent, or the white colorant may be commercially available (i.e., the white metal oxide pigment is pre-coated with the coating).

Examples of commercially available alumina coated white metal oxide pigments include the following white colorants available from Huntsman Chemical: TR® 50, which has an alumina content of about 2.6 wt % based on the white metal oxide pigment content; TR® 52, which has an alumina content of about 3.4 wt % based on the white metal oxide pigment content; TR® 60, which has an alumina content of about 3.1 wt % based on the white metal oxide pigment content; TR® 90, which has an alumina content of about 4 wt % based on the white metal oxide pigment content; and TR® 93 which has an alumina content of about 3.9 wt % based on the white metal oxide pigment content; and the following white colorants available from The Chemours Company (referred to as "Chemours"): TI-PURE® R900, which has an alumina content of about 4.3 wt % based on the white metal oxide pigment content; CR®-813, which has an alumina content of about 3.5 wt % based on the white metal oxide pigment content; and CR®-828, which has an alumina content of about 3.5 wt % based on the white metal oxide pigment content.

Example of commercially available alumina and silica coated white metal oxide pigment include TI-PURE® R706, TI-PURE® R960, TI-PURE® R746, TI-PURE® R796+, TI-PURE® R902+, TI-PURE® R942P, TI-PURE® TS 6200, and TI-PURE® TS-6300, all of which are from Chemours. As an example, TI-PURE® R931 (Chemours) has an alumina content of about 6.4 wt % and a silica content of about 10.2 wt % based on the white metal oxide pigment content.

The white colorant may be present in the release agent in an amount ranging from about 5 wt % to about 20 wt % based on a total weight of the release agent.

The release agent also includes boehmite particles having a particle size that is smaller than the particle size of the white metal oxide pigment. In an example, the particle size of the white metal oxide pigment ranges from about 100 nm to about 600 nm, and the particle size of the boehmite particles ranges from about 10 nm to less than 200 nm.

Boehmite (i.e., aluminum oxo-hydroxide, AlO(OH)) particles have both cationic and anionic sites when exposed to aqueous environment over a wide pH range. Surface hydroxyl groups of such aluminum oxides may adsorb protons and form cationic sides, as follows: $AlOH^+$ $H^+\rightarrow AlOH^{2+}$. The surface hydroxyls may be also deprotonated and form anionic sites: $AlOH^+OH^-\rightarrow AlO^-+H_2O$. The distribution of surface charges on the nano-sized boehmite particles may be anisotropic. This is because the nano-sized boehmite particles in aqueous dispersions can easily aggregate into a complex network of structures. Furthermore, nano-sized boehmite can attach or adsorb to a surface of the white colorant disclosed herein, which further assist with achieving the flocculated masses described herein. In further detail, the boehmite particles can self-aggregate and adsorb to the surface of the white colorant, and can further be suspended in the release agent for providing controlled destabilization of the release agent formulations. To illustrate, alumina and/or silica coated titanium dioxide ($TiO_2$) pigment particles can agglomerate into loose flocs, and boehmite particles can become trapped inside these loose flocs. Settling of these loose flocs or flocculated masses produces loose low-density sediment with very weak mechanical properties. Minor agitation, such as might occur with ink recirculation in an inkjet printer printhead and/or ink supplies can be sufficient for quick system recovery into an operational state after long term inactivity.

An example of commercially available boehmite includes DISPAL® 23N4-80, from Sasol. This commercially available dry powder is pre-neutralized with a suitable acid (e.g., nitric acid) so that it is readily dispersible in water. Other boehmites that are not pre-treated with an acid may be made into a suspension prior to being incorporated into the release agent. This suspension may be made by adding the boehmite into water and an acid (such as nitric or sulfuric acid). A target pH for this suspension may be 4.

The boehmite particles may be present in the release agent in an amount ranging from about 0.1 wt % to about 1 wt % based on a total weight of the release agent.

A polymeric dispersant may also be associated with a surface of the white colorant. Suitable dispersing agents can allow for dispersibility and stability in an aqueous environment, as well as for contributing to a controlled destabilizing effect (along with the alumina and/or silica coating) when the white metal oxide pigment settles and forms a white flocculated colorant mass. These dispersants can also be prepared to have little to no impact on the viscosity of the liquid phase of the release agent, as well as retain good printhead reliability in thermal inkjet printheads (if the ink is a thermal inkjet ink). If the release agent is a piezoelectric inkjet release agent, then additional flexibility regarding viscosity is tolerable.

In an example, the polymeric dispersant can include a non-ionic or predominantly non-ionic dispersant defined by an acid number not higher than 100 mg KOH/g based on dry polymer weight, wherein the polymeric dispersant has a comb-type structure with anionic or acidic anchor group(s) that can attach to the coating of the white colorant. In another example, the polymeric dispersant can include a short-chain anionic dispersant defined by having an acid number higher than 100 mg KOH/g based on dry polymer weight, which can attach to the coating of the white colorant. In still another example, the release agent includes both the non-ionic or predominantly non-ionic polymer dispersant and the anionic dispersant.

As used herein, the "non-ionic or predominantly non-ionic dispersants" include non-ionic dispersants, as well as only weakly ionic dispersants, i.e. the acid number of the non-ionic or predominantly non-ionic/weak anionic dispersant, per dry polymer, is not higher than 100 mg KOH/g, and, in some instances, is not higher than 50 mg KOH/g, or even not higher than 30 mg KOH/g. In one example, a non-ionic dispersing agent with no anionic properties can be used (e.g., in combination with an anionic dispersant). These non-ionic or predominantly non-ionic dispersants can range in weight average molecular weight from 500 to 50,000.

Examples of suitable non-ionic dispersants that can be used include water-hydrolyzable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes SILQUEST® A1230 polyethylene glycol methoxysilane, which is commercially available from Momentive Performance Materials. Other examples include soluble low-to-midrange (e.g., usually molecular mass of the polymer less than 15,000 Da) branched co-polymers of comb-type structures with polyether pendant chains and acidic anchor groups attached to the backbone, such as DISPERBYK® 190 and DISPERBYK® 199 available from BYK Chemie, as well as DISPERSOGEN® PCE available from Clariant.

Reactive hydrophilic alkoxysilane dispersants can be used, examples of which include hydrolyzable alkoxysilanes with alkoxy group(s) attached to water-soluble (hydrophilic) moieties, such as water-soluble polyether oligomer chains, phosphate groups, or carboxylic groups. In some examples, the polymeric dispersant can be a polyether alkoxysilane or polyether phosphate dispersant. Upon dissolution in water containing the white colorant, the alkoxysilane group of the dispersant often hydrolyzes, resulting in formation of a silanol group. The silanol group, in turn, may react or form hydrogen bonds with hydroxyl groups of the white colorant surface, as well as with silanol groups of other dispersant molecules through hydrogen bonding. These reactions lead to bonding or preferential absorption of the dispersant molecules to the white colorant surfaces and also form bonds between dispersant molecules themselves. As a result, these interactions can form thick hydrophilic coatings of reactive dispersant molecules on surface of the white colorant. This dispersant coating can increase the hydrodynamic radius of the white colorant particles and thus reduce their effective density and settling rate. Furthermore, the dispersant coating and the boehmite particles prevent agglomeration of the white colorant upon settling so that when sediment and settling does occur over time in the release agent, the settled pigment and other particles remain fluffy and thus are easy to redisperse upon agitation. In still further detail, these dispersants have a relatively short chain length and do not contribute significantly to the release agent viscosity.

As mentioned, a suitable alkoxysilane dispersant can have an alkoxysilane group which can be easily hydrolyzed in an aqueous environment and produce a silanol group, and a hydrophilic segment. The general structure of the alkoxysilane group is —$Si(OR)_3$, where R most can be methyl, ethyl, n-propyl, isopropyl, or even a longer (branched or unbranched) alkane chain. It is noted that the longer the hydrocarbon (R), the slower the hydrolysis rate and rate of interaction with the white colorant surface. In an example, structures with —$Si(OR)_3$, where R is methyl or ethyl can be used. The hydrophilic segment of the alkoxysilane dispersant can likewise be large enough (relative to the whole molecule size) in order to enable dispersant solubility in an aqueous environment, as well as to prevent agglomeration of the white colorant and the boehmite particles. In an example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In a specific example, polyether alkoxysilane dispersants that may be used to disperse the white colorant can be represented by the following general Formula (I):

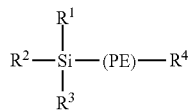

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2$—$CH_2$—O—), or polypropylene glycol (PPG) chain segment (—$CH_2$—$CH(CH_3)$—O—), or a mixture of both types. In some examples, the polyether chain segment (PE) contains PEG units (—$CH_2CH_2$—O—).

c) $R^4$ is hydrogen, or a linear or a branched alkyl group. In some examples, $R^4$ is an alkyl group having from 1 to 5 carbon atoms.

Other examples of dispersants used to disperse the white colorant can include polyether alkoxysilane dispersants having the following general Formula (II):

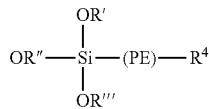

wherein R', R" and R'" are linear or branched alkyl groups. In some examples, R', R" and R'" are linear alkyl groups having from 1 to 3 carbon atoms in chain length. In some examples, R', R" and R'" are —$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, R4 is $CH_3$ or $C_2H_5$.

In some examples, the white colorant present in the release agent is dispersed with polyether alkoxysilanes. Examples of suitable polyether alkoxysilanes include $(CH_3O)_3Si—(CH_2CH_2O)_n$, H; $(CH_3CH_2O)_3Si—(CH_2CH_2O)_n$, H; $(CH_3O)_3Si—(CH_2CH_2O)_n$, $CH_3$; $(CH_3CH_2O)_3Si—(CH_2CH_2O)_n$, $CH_3$; $(CH_3O)_3Si—(CH_2CH_2O)_n$, $CH_2CH_3$; $(CH_3CH_2O)_3Si—(CH_2CH_2O)_n$, $CH_2CH_3$; $(CH_3O)_3Si—(CH_2CH(CH_3)O)_n$, H; $(CH_3CH_2O)_3Si—(CH_2CH(CH_3)O)_n$, H; $(CH_3O)_3Si—(CH_2CH(CH_3)O)_n$, $CH_3$; $(CH_3CH_2O)_3Si—(CH_2CH(CH_3)O)_n$, $CH_3$; wherein n is an integer equal to 2 or greater. In some examples, n is an integer ranging from 2 to 30 and, in some other examples, n is an integer ranging from 5 to 15. Commercial examples of the polyether alkoxysilane dispersants include, but are not limited to, the aforementioned SILQUEST® A-1230 manufactured by Momentive Performance Materials, and DYNASYLAN® 4144 manufactured by Evonik/Degussa.

Also as used herein, the "short-chain anionic dispersants" that can be used include polymeric dispersants with chain lengths short enough to impact viscosity of ink formulation at moderate concentrations. These dispersants have an acid number higher than 100 mg KOH/g based in dry polymer content. As examples, short-chain anionic dispersants can include dispersants having a weight average molecular weight lower than 30,000, or in some instances, lower than 15,000, e.g., ranging from about 1,000 to about 30,000, or from about 2,000 to about 15,000.

Some specific examples of low weight average molecular weight (Mw), short-chain anionic dispersants can include acrylic and methacrylic acid homopolymers, such as polyacrylic acid (PAA), polymethacrylic acid (PMAA), or their salts. More specific examples include, but are not limited to, CARBOSPERSE® K-7028 (PAA with Mw of about 2,300), CARBOSPERSE® K-752 (PAA with Mw of about 2,000), CARBOSPERSE® K-7058 (PAA with Mw of about 7,300), CARBOSPERSE® K-732 (PAA with Mw of about 6,000), CARBOSPERSE® K-752 (Na salt of PMAA with Mw of about 5,000), all available from Lubrizol Corporation. Other examples include DISPEX® AA 4935 available from BASF Corp., as well as TAMOL® 945 available from The Dow Chemical Co.

Low weight average molecular weight acrylic and methacrylic acid co-polymers with other carboxylic monomer moieties can also be used, such as co-polymers of acrylic and maleic acids available from Kelien Water Purification Technology Co. Low weight average molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, CARBOSPERSE® K-775 and CARBOSPERSE® K-776 (co-polymers of acrylic and sulfonic acid), CARBOSPERSE® K-797, CARBOSPERSE® K-798, or CARBOSPERSE® K-781 (co-polymers of acrylic, sulfonic acid and styrenesulfonic acid), all available from Lubrizol Corporation.

Additionally, low weight average molecular weight co-polymers of carboxylic acid monomers with some hydrophobic monomers can likewise be used. Dispersants from this group are suitable in the release agent disclosed here if the acid number (content of hydrophilic acidic moieties in polymer chain) is high enough to make the dispersant well soluble in aqueous phase. Examples of such dispersants include, but are not limited to styrene-acrylic acid copolymers such as JONCRYL® 671, JONCRYL® 683, JONCRYL® 296, or JONCRYL® 690, available from BASF Corp., as well as other water soluble styrene-maleic anhydride co-polymer resins.

Whether the dispersants are used alone or in combination, the total amount of dispersant used to disperse the white colorant and other solids may vary from about 0.3 wt % to about 300 wt % of the white metal oxide pigment content. In some examples, the dispersant content ranges from about 0.5% to about 5% by weight of the white metal oxide pigment content.

As mentioned herein, the release agent includes the latex binder, which is an aqueous dispersion of polymer particles. This latex binder may be referred to herein as the second binder or second latex binder, and it may be the same latex binder that is present in the binding agent (described below), or it may be a different latex binder than that which is present in the binding agent.

The polymer particles of the latex may have several different morphologies. For example, the polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. For another example, the polymer particle morphology may resemble a raspberry, in which a hydrophobic core is surrounded by several smaller hydrophilic particles that are attached to the core. For still another example, the polymer particles may include 2, 3, or 4 particles that are at least partially attached to one another.

The latex polymer particles may have a weight average molecular weight ranging from about 5,000 to about 500,000. As examples, the weight average molecular weight of the latex particles may range from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. As used herein, typical ambient conditions include a temperature range from about 20° C. to about 25° C., an atmospheric pressure of about 100 kPa (kilopascals), and a relative humidity ranging from about 30% to about 90%. The glass transition temperature of the latex particles may range from about −20° C. to about 130° C., or in a specific example, from about 60° C. to about 105° C.

Examples of monomers that may be used to form the hydrophobic component include $C_1$ to $C_8$ alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In examples, the aqueous dispersion of polymer particles (latexes) may be produced by emulsion polymerization or co-polymerization of any of the previously listed monomers. Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

In an example, the latex binder is present in the release agent in an amount ranging from about 1 wt % to about 14 wt % based on a total weight of the release agent. In another example, the latex binder is present in the release agent in an amount ranging from about 2 wt % to about 10 wt % based on the total weight of release agent.

The release agent also includes an aqueous vehicle. The aqueous vehicle components may include water, organic co-solvent(s), surfactant(s), and/or antimicrobial agent(s), to form the non-Newtonian release agent having from about 5 wt % to about 20 wt % of the white colorant, from about 0.1 wt % to about 1 wt % of the boehmite, and from about 5 wt % to about 14 wt % of the latex binder, which may be in flocculated or resuspended form.

Examples of suitable organic co-solvents include any water miscible, high-boiling point solvent and/or humectant, which has a boiling point of at least 140° C. In other examples, the boiling point is greater than 180° C. Classes of organic co-solvents that may be used include aliphatic alcohols, aromatic alcohols, diols, glycol ethers, polyglycol ethers, lactams, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the release agent may include 2-pyrrolidone, 1,2-butanediol, 2-methyl-1,3-propanediol, 1-(2-hydroxyethyl)-2-pyrrolidone, or combinations thereof. Some suitable commercially available glycol ethers are those in the DOWANOL® product line from The Dow Chemical Co.

The co-solvent may be present in an amount ranging from about 0.1 wt % to about 50 wt % (based on the total weight of the release agent). It is to be understood that other amounts outside of this range may also be used depending, at least in part, on the jetting architecture used to dispense the release agent.

The release agent may also include surfactant(s). Surfactant(s) may be used to improve the wetting properties and the jettability of the release agent. Examples of suitable surfactants include those that are non-ionic, cationic, or anionic. Examples of suitable surfactants/wetting agents include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or secondary alcohol ethoxylates (commercially available as TERGITOL® TMN-6, TERGITOL® 15-S-7, TERGITOL® 15-S-9, etc. from The Dow Chemical Co.).

Whether a single surfactant is used or a combination of surfactants is used, the total amount of surfactant(s) in the release agent may range from about 0.01 wt % to about 10 wt % based on the total weight of the release agent.

The release agent may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof.

In an example, the release agent may include a total amount of antimicrobial agents that ranges from about 0.01 wt % to about 1 wt %. In an example, the antimicrobial agent is a biocide and is present in the release agent in an amount of about 0.1 wt % (based on the total weight of the release agent). These percentages may include both active antimicrobial agent and other non-active components present with the antimicrobial agent.

In some examples, the balance of the release agent is water (e.g., deionized water). In these examples, the amount of water may vary depending upon the weight percent of the other release agent components. In other examples (e.g., piezoelectric formulations), water may be present in amounts less than 50 wt %, and the balance of the release agent is a solvent (e.g., any of the previously listed co-solvents).

The pH of the release agent may range from about 8 to about 10, and may be adjusted using any suitable base (e.g., potassium hydroxide (KOH)).

An example formulation of the thermal inkjet release agent is shown in Table 1 and an example formulation of a piezoelectric inkjet release agent is shown in Table 2.

TABLE 1

| Component Type | Components | Formulation (wt %) |
|---|---|---|
| White Colorant | TI-PURE ® R-960 | 11.3* |
| Boehmite | DISPAL ® 23N4-80 | 0.3** |
| Polymeric Dispersant | CARBOSPERSE ® K-7028 | 0.5*** |
| | DISPERBYK ® 190 | 0.8*** |
| Co-solvent | 2-methyl-1,3-propanediol | 9.0 |
| | 2-pyrrolidone | 16.0 |
| Surfactant | TERGITOL ® 15-S-7 | 0.9 |
| | CAPSTONE ® FS-35 | 0.5 |
| Antimicrobial | ACTICIDE ® B20 | 0.15 |
| Binder | Acrylic latex dispersion | 10.0 |
| Water | Deionized Water | Balance | pH = 8.0 (adjusted with KOH solution)
*represents percentage of solid alumina and silica coated $TiO_2$ particles
**represents percentage of solid boehmite particles
***represents percentages of TI-PURE R-960

TABLE 2

| Component Type | Components | Formulation (wt %) |
|---|---|---|
| White Colorant | TI-PURE ® R-960 | 19.2* |
| Boehmite | DISPAL ® 23N4-80 | 0.25** |
| Polymeric Dispersant | CARBOSPERSE ® K-7028 | 0.5*** |
| | DISPERBYK ® 190 | 0.8*** |
| Co-solvent | 1,2-butanediol | 12.0 |
| | 2-pyrrolidone | 2.5 |
| | DOWANOL ®TPM glycol ether | 1.5% |
| | DOWANOL ® TPnB (Tripropylene Glycol n-Butyl Ether) | 0.24% |
| Surfactant | TERGITOL ® 15-S-7 | 0.3 |
| | CAPSTONE ® FS-35 | 0.2 |
| Antimicrobial | ACTICIDE ® B20 | 0.15 |
| Binder | Acrylic latex dispersion | 16.5 |
| Water | Deionized Water | Balance | pH = 8.0 (adjusted with KOH solution)
*represents percentage of solid alumina and silica coated $TiO_2$ particles
**represents percentage of solid boehmite particles
***represents percentages of TI-PURE R-960

In examples of the release agent, it is desirable that the total volume fraction of solids be about 30 vol. % or less, so that the release agent is jettable via the desired inkjet printhead (e.g., thermal inkjet printhead, piezoelectric inkjet printhead, etc.). As such, the volume fraction of the white colorant, polymeric dispersant, boehmite, and the latex binder may be adjusted so that together, the components do not exceed, for example, from about 25 vol. % to about 30 vol. % of the total volume of the release agent.

The release agent disclosed herein exhibits a white color, due, in part, to the white colorant and the latex binder. The white color may be desirable so that an operator can easily identify the patterned breakable connection in the intermediate structure. Because the white colorant is present in the irreversibly breakable connection after sintering, at least some of the white color is retained, and can aid in easily identifying the irreversibly breakable connection in the final 3D printed article.

In some examples, the release agent may also include a non-white colorant. A non-white colorant may be desirable to provide additional color to the patterned breakable connection, or to both the patterned breakable connection and the irreversibly breakable connection.

The non-white colorant may be any suitable color, such as cyan, magenta, yellow, black, etc. In some examples, the non-white colorant may be selected to burn out during sintering. In these instances, the color is observed in the patterned breakable connection (pre-sintering) and white is observed in the irreversibly breakable connection (post-sintering). In other examples, the non-white colorant may be selected to survive sintering. In these instances, the color is observed in the patterned breakable connection (pre-sintering) and also is observed in the irreversibly breakable connection (post-sintering).

Example of suitable non-white colorants that do not survive sintering include organic dyes and organic pigments. Examples of suitable organic dyes include Direct Blue 199 (available from Avecia as PROJET™ Cyan Special), Acid Blue 9, Direct Red 9, Direct Red 227, Magenta 377 (available from Ilford AG, Rue de l'Industrie, CH-1700 Fribourg, Switzerland), Acid Yellow 23, Direct Yellow 132, Direct Yellow 86, Yellow 104 (Ilford AG), Direct Yellow 4 (BASF Corp.), Yellow PJY H-3RNA (Avecia), and Direct Yellow 50 (Avecia). In specific examples, Direct Blue 199, Magenta 377, or Ilford Yellow 104 are employed, respectively, as the cyan, magenta, or yellow colorants. Examples of suitable organic pigments include for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 177, Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation and Sun Chemical Corporation.

Example of suitable non-white colorants that do survive sintering include inorganic pigments, such as carbon pigments, calcium sulfide, umber (mixtures of iron and manganese oxide), cobalt blue (cobalt(II) oxide-aluminum oxide, or cobalt(II) aluminate), chrome yellow (PbCrO), and iron oxide.

The carbon pigment can be almost any commercially available carbon pigment that provides acceptable optical density and print characteristics. Carbon pigments suitable for use herein include carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4.

When included, the non-white colorant may be present in the release agent in an amount ranging from about 0.5 wt % to about 4 wt % of the total weight of the release agent.

Some examples of preparing the release agent may begin with treating the white metal oxide pigment with alumina and/or silica to form the white colorant. In an example, the alumina and/or silica can be coated on the pigment by precipitation from a liquid phase. Other examples may begin by selecting a commercially available white colorant.

The white colorant may then be dispersed with the polymeric dispersant(s), and the boehmite particles may be added to this dispersion. In an example, the method for preparing the release agent may include milling a mixture of the white colorant (i.e., a white metal oxide pigment having an alumina and/or silica coating thereon) and the polymeric dispersant in a water-based carrier to form a pigment dispersion. In an example, the pigment dispersion may then be combined with the aqueous vehicle disclosed herein, and then the boehmite particles may be added to form the release agent. It is to be understood that the boehmite particles may alternatively be added to the mixture of the white colorant and the polymeric dispersant in a water-based carrier, or to the aqueous vehicle before it is mixed with the pigment dispersion. In one example, the method of forming the release agent can include allowing the non-Newtonian white ink to destabilize causing the suspended white colorant and the boehmite to form a flocculated mass.

Binding Agent

The binding agent may be used to pattern build material where it is desirable to form the 3D object and where it is desirable to form the 3D support structure.

The binding agent includes the latex binder. This binder may be referred to herein as the first binder or first latex binder, and it may be the same latex binder that is present in the release agent, or it may be a different latex binder than that which is present in the release agent. As such, any of the binders set forth herein for examples of the release agent may be used in the binding agent. In an example, the binder is present in the binding agent in an amount ranging from about 5 wt % to about 20 wt % based on a total weight of the binding agent. In another example, the binder is present in the binding agent in an amount ranging from about 10 wt % to about 18 wt % based on the total weight of binding agent. These percentages may include active binder, and the percentages may be higher when other non-active components are considered (e.g., in Tables 3 and 4).

In addition to the binder, the binding agent may also include water, co-solvent(s), surfactant(s), polymeric dispersant(s), and/or antimicrobial agent(s). In these examples, any of the previously described co-solvent(s), surfactant(s), polymeric dispersant(s), and/or antimicrobial agent(s), may be used in any of the given amounts, except that the weight percentages are with respect to a total weight of the binding agent.

It is to be understood that the amount of water, co-solvent(s), and solids and/or the type of additive that is included may be adjusted depending upon whether the binding agent is to be deposited by a piezoelectric printhead or a thermal inkjet printhead. As one example, when the binding agent is a thermal inkjet binding agent, the liquid vehicle is an aqueous based vehicle including at least 50% by weight of water, or when the binding agent is a piezoelectric inkjet binding agent, the liquid vehicle is a solvent based vehicle including at least 10% by weight of the co-solvent.

The composition of the binding agent is similar to examples of the release agent except that the white colorant and boehmite are excluded from the formulation of the binding liquid functional agent.

The pH of the binding may not be adjusted, but rather the binding agent may exhibit its natural pH.

An example formulation of a thermal inkjet binding is shown in Table 3, and an example formulation of a piezoelectric inkjet binding agent is shown in Table 4.

TABLE 3

| Component Type | Components | Formulation (wt %) |
| --- | --- | --- |
| Co-solvent | 2-methyl-1,3-propanediol | 9.0 |
|  | 2-pyrrolidone | 16.0 |
| Surfactant | TERGITOL ® 15-S-7 | 0.9 |
|  | CAPSTONE ® FS-35 | 0.5 |
| Antimicrobial | ACTICIDE ® B20 | 0.15 |
| Binder | Acrylic latex dispersion | 16.0 |
| Water | Deionized Water | Balance |

TABLE 4

| Component Type | Components | Formulation (wt %) |
| --- | --- | --- |
| Co-solvent | 1,2-butanediol | 13.6 |
|  | 2-pyrrolidone | 2.6 |
|  | DOWANOL ® TPM glycol ether | 1.7% |
|  | DOWANOL ® TPnB (Tripropylene Glycol n-Butyl Ether) | 0.3% |
| Surfactant | TERGITOL ® 15-S-7 | 0.4 |
|  | CAPSTONE ® FS-35 | 0.2 |
| Antimicrobial | ACTICIDE ® B20 | 0.15 |
| Binder | Acrylic latex dispersion | 25.0 |
| Water | Deionized Water | Balance |

3D Printing Kits and Compositions

The metallic build material, release agent, and binding agent described herein may be part of a 3D printing composition and/or kit. In an example, the three-dimensional (3D) printing composition or kit, comprises the metallic build material composition; the binding agent; and the release agent for patterning a breakable connection. The binding agent includes a first latex binder. The release agent includes a white colorant including a white metal oxide pigment coated with a coating selected from the group consisting of alumina, silica, and combinations thereof; boehmite particles; a second latex binder; and an aqueous vehicle.

In an example of the 3D printing kit or composition, the white colorant is present in an amount ranging from about 5 wt % to about 20 wt % of a total weight of the release agent, the boehmite particles are present in an amount ranging from about 0.1 wt % to about 1 wt % of the total weight of the release agent, and the second binder is present in an amount ranging from about 5 wt % to about 14 wt % of the total weight of the release agent.

In another example of the 3D printing kit or composition, the particle size of the white metal oxide pigment ranges from about 100 nm to about 600 nm, and the particle size of the boehmite particles ranges from about 10 nm to less than 200 nm.

In still other examples of the 3D printing kit or composition, the release agent further comprises a non-white colorant.

While some examples have been provided, it is to be understood that any example of the metallic build material, the release agent, and the binding agent may be used in the examples of the 3D printing composition or kit.

In some examples, the 3D printing composition or kit consists of the metallic build material, the release agent, and the binding agent with no other components.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

Methods

An example of the 3D printing method 100, in which the release agent and the binding agent are used, is depicted in FIG. 1. Generally, the method 100 includes patterning build material layers to form an intermediate structure, the patterning including: selectively applying a binding agent, including a first binder, to define: a build material support structure and a patterned intermediate part; and selectively applying a release agent to define a patterned breakable connection between at least a portion of the build material support structure and at least a portion of the patterned intermediate part, the release agent including: a white colorant including a white metal oxide pigment coated with a coating selected from the group consisting of alumina, silica, and combinations thereof; boehmite particles having a particle size that is smaller than a particle size of the white metal oxide pigment; a second binder; and an aqueous vehicle (reference numeral 102); and heating the intermediate structure to form an irreversibly breakable connection at the patterned breakable connection (reference numeral 104).

Any examples of the build material, the binding agent, and the release described herein may be used in the method 100. Furthermore, the method 100 may be used to form 3D objects, 3D support structures, and irreversibly breakable connections of any size and/or shape, as long as the irreversibly breakable connection is located between at least a portion of the 3D object and the 3D support structure, and provides a breakable junction between the 3D object and the 3D support structure.

At reference numeral 102 in FIG. 1, metallic build material layers are patterned to form the intermediate structure, which is ultimately heated to form the 3D object, 3D support structure, and irreversibly breakable connection. FIGS. 2A through 2D depict various examples of the intermediate structures 40A, 40B, 40C, 40D that may be made using the method 100. In some examples (e.g., FIGS. 2A and 2D), the patterned breakable connection 23 alone separates the build material support structure 23 from the patterned intermediate part 25, and in other examples (e.g., FIGS. 2B and 2C), one or more layers of non-patterned build material 28 and the patterned breakable connection 23 separate the build material support structure 23 from the patterned intermediate part 25.

In the examples shown in FIGS. 2A through 2D, several build material layers 12, 12A, 12B . . . 12H (FIG. 2A), etc. have been applied and patterned to define different examples of the build material support structure 23, the patterned intermediate part 25, and the patterned breakable connection 32. Repeated application and patterning may be performed until the total number of build material layers that are patterned form a complete build material support structure 23 according to a 3D model of the 3D support structure, a complete patterned intermediate part 25 according to a 3D model of the 3D object, and a complete patterned breakable connection 32 according to a 3D model of the irreversibly breakable connection.

The metallic build material 14 may be spread to form the layers 12, 12A, 12B, etc. on a build area platform 16, and the respective layers 12, 12A, 12B, etc. may be patterned with the binding agent and/or an example of the release agent one layer at a time. Examples of the spreading of the build material 14 and the application of the various agents to pattern are described in more detail in reference to FIGS. 4A-4J. The agent(s) used to pattern any individual build material layer 12, 12A, 12B, etc. will depend upon whether the patterned portion is part of the build material support structure 23, the patterned intermediate part 25, or the patterned breakable connection 32. The binding agent is used to pattern the build material support structure 23 and the patterned intermediate part 25, and the release agent is used to pattern the patterned breakable connection 32.

Figure 2A:
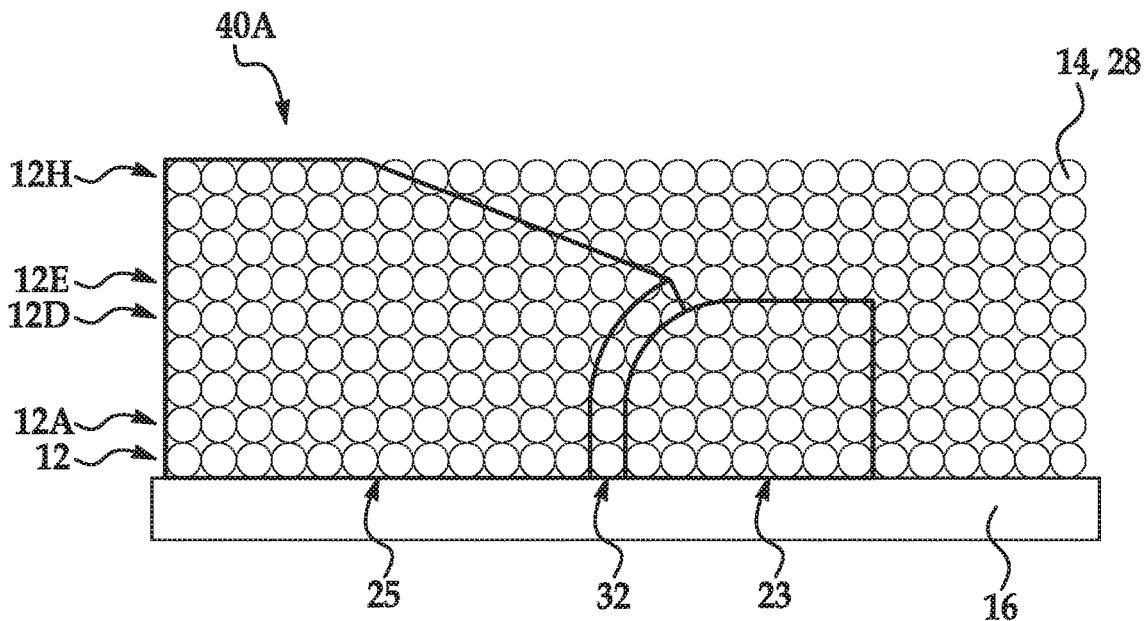
FIGS. 2A through 2D are schematic views of different examples of intermediate structures, each of which includes a build material support structure, a patterned intermediate part, and a patterned breakable connection defined between at least a portion of the build material support structure and the patterned intermediate part.
Figure 2B:
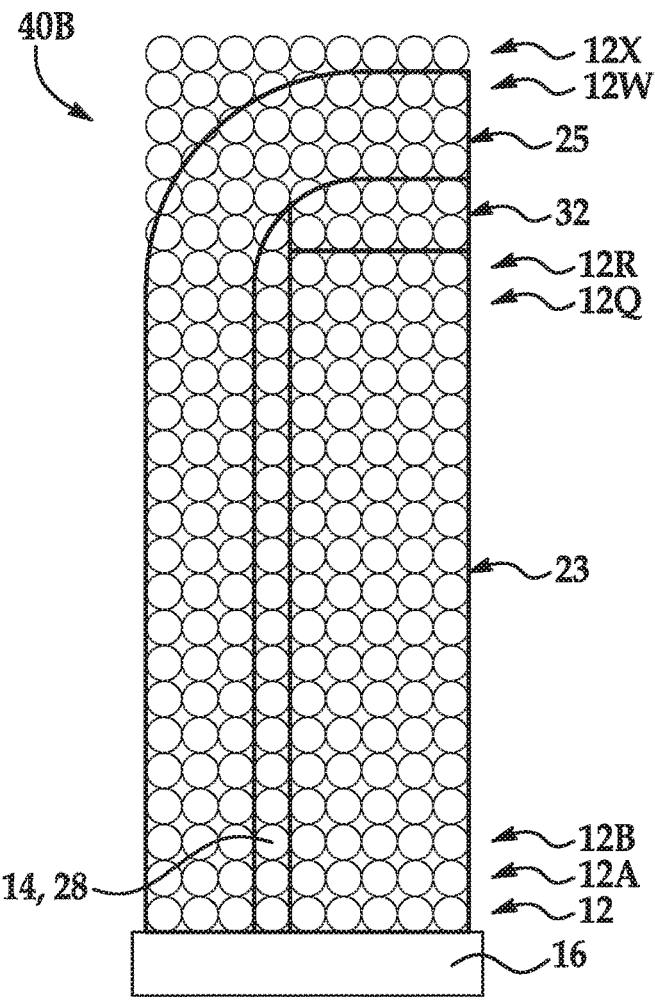
Figure 2C:
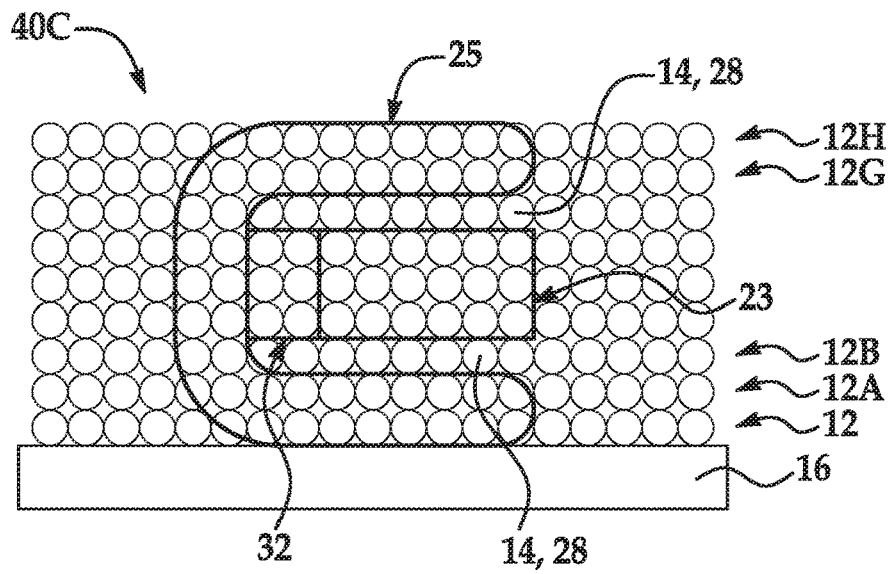

As shown in FIGS. 2A through 2C, the patterned breakable connection 32 is defined between at least a portion of the build material support structure 23 and the patterned intermediate part 25. In these examples, the build material support structure 23 provides support for at least some of the build material 14 of the patterned intermediate part 25 during the patterning process and during the subsequent heating process. Also in these examples, the patterned intermediate part 25 at least partially overlies the build material support structure 23.

In the example shown in FIG. 2A, the patterned breakable connection 32 is built up vertically between one surface of the build material support structure 23 and one surface of the patterned intermediate part 25, and then is curved so that it overlies a portion of the build material support structure 23. In this example, the build material support structure 23 provides support at least for the curved portion of the patterned intermediate part 25. To form this intermediate structure 40A, the binder agent is selectively applied on layers 12 through 12H to define the patterned intermediate part 25; the binder agent is selectively applied on layers 12 through 12D to define the build material support structure 23; and the release agent is selectively applied on layers 12 through 12E to define the patterned breakable connection 32.

In the example shown in FIG. 2B, the patterned breakable connection 32 is horizontally defined between one surface of the build material support structure 23 and one surface of the patterned intermediate part 25. In this example, the patterned breakable connection 32 completely overlies the build material support structure 23, which provides support for the overlying portion of the patterned intermediate part 25. To form this intermediate structure 40B, the binder agent is selectively applied on layers 12 through 12W to define the patterned intermediate part 25; the binder agent is selectively applied on layers 12 through 12R to define the build material support structure 23; and the release agent is selectively applied on layers 12S and 12T to define the patterned breakable connection 32. Also in this example, some of the build material 14 between the patterned intermediate part 25 and the build material support structure 23 remains non-patterned (shown at reference numeral 28). The non-patterned build material 28 can be easily removed after patterning and before heating, and thus can create a space between the patterned intermediate part 25 and the build material support structure 23.

In the example shown in FIG. 2C, the patterned breakable connection 32 is built up vertically between one surface of the build material support structure 23 and a portion of one surface of the patterned intermediate part 25. To form this intermediate structure 40C, the binder agent is selectively applied on layers 12 through 12H to define the patterned intermediate part 25; the binder agent is selectively applied on layers 12C through 12E to define the build material support structure 23; and the release agent is selective applied on layers 12C through 12E to define the patterned breakable connection 32. Also in this example, some of the build material 14 between the patterned intermediate part 25 and the build material support structure 23 remains non-patterned 28, and thus can create spaces between the patterned intermediate part 25 and the build material support structure 23. In this example, the build material support structure 23, in combination with the non-patterned build material 28, provides support for the overlying portion of the patterned intermediate part 25 formed thereon during patterning.

In the example shown in FIG. 2C, the intermediate structure 40C can be extracted from any non-patterned build material 14, 28 surrounding the structure 40C and in the spaces, and then rotated (e.g., 90°) so that the build material support structure 23 contacts a surface of a heating mechanism and so that the curved center portion of the horseshoe or C-shaped part is substantially parallel to the surface of the heating mechanism. In these examples, the build material support structure 23 provides support for a different portion of the patterned intermediate part 25 during heating than during patterning.

Figure 2D:
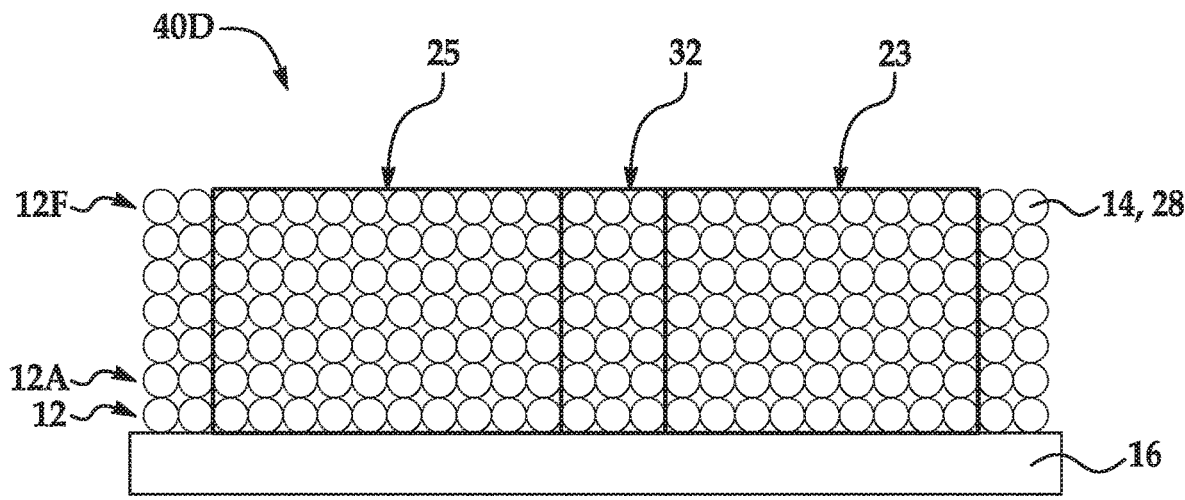

As shown in FIG. 2D, the patterned breakable connection 32 is defined between the build material support structure 23 and the patterned intermediate part 25. In this example, the patterned breakable connection 32 is at least partially perpendicular to the build area platform 16. In this and other similar examples, the build material support structure 23 may be next to the patterned breakable connection 32, which is next to the patterned intermediate part 25 on the build area platform 16. In these examples, there is no non-patterned build material 28 between the build material support structure 23 and the patterned intermediate part 25, and the patterned intermediate part 25 does not overly the build material support structure 23 during patterning.

In the example shown in FIG. 2D, the intermediate structure 40D can be extracted from any non-patterned build material 14, 28 surrounding the structure 40D, and then rotated (e.g., 90°) so that the build material support structure 23 contacts a surface of a heating mechanism and the patterned breakable connection 32 is at least partially parallel to the surface of the heating mechanism. In these examples, the build material support structure 23 provides support for the patterned intermediate part 25 during heating, but not during the printing/patterning process.

In the example shown in FIG. 2D, patterning the metallic build material layers includes: iteratively applying individual build material layers 12, 12A, 12B, etc.; selectively applying the binding agent to at least some, or to each, of the individual build material layers to define several layers of the build material support structure 23 and several layers of the patterned intermediate part 25; and selectively applying the release agent on each of the individual build material layers to define the patterned breakable connection between the several layers of the build material support structure 23 and the several layers of the patterned intermediate part 25. More specifically, to form this intermediate structure 40D, the binder agent is selectively applied on layers 12 through 12F to define the patterned intermediate part 25; the binder agent is selectively applied on layers 12 through 12F to define the build material support structure 23; and the release agent is selective applied on layers 12 through 12F to define the patterned breakable connection 32.

Several examples of the intermediate structure 40 and the patterned breakable connection 32 have been illustrated in FIGS. 2A through 2D. It is to be understood that the components 23, 25, 32 of the intermediate structure 40 may have other configurations, as long as the geometry of the irreversibly breakable connection can be broken to separate the 3D object from the 3D support structure.

Figure 3:
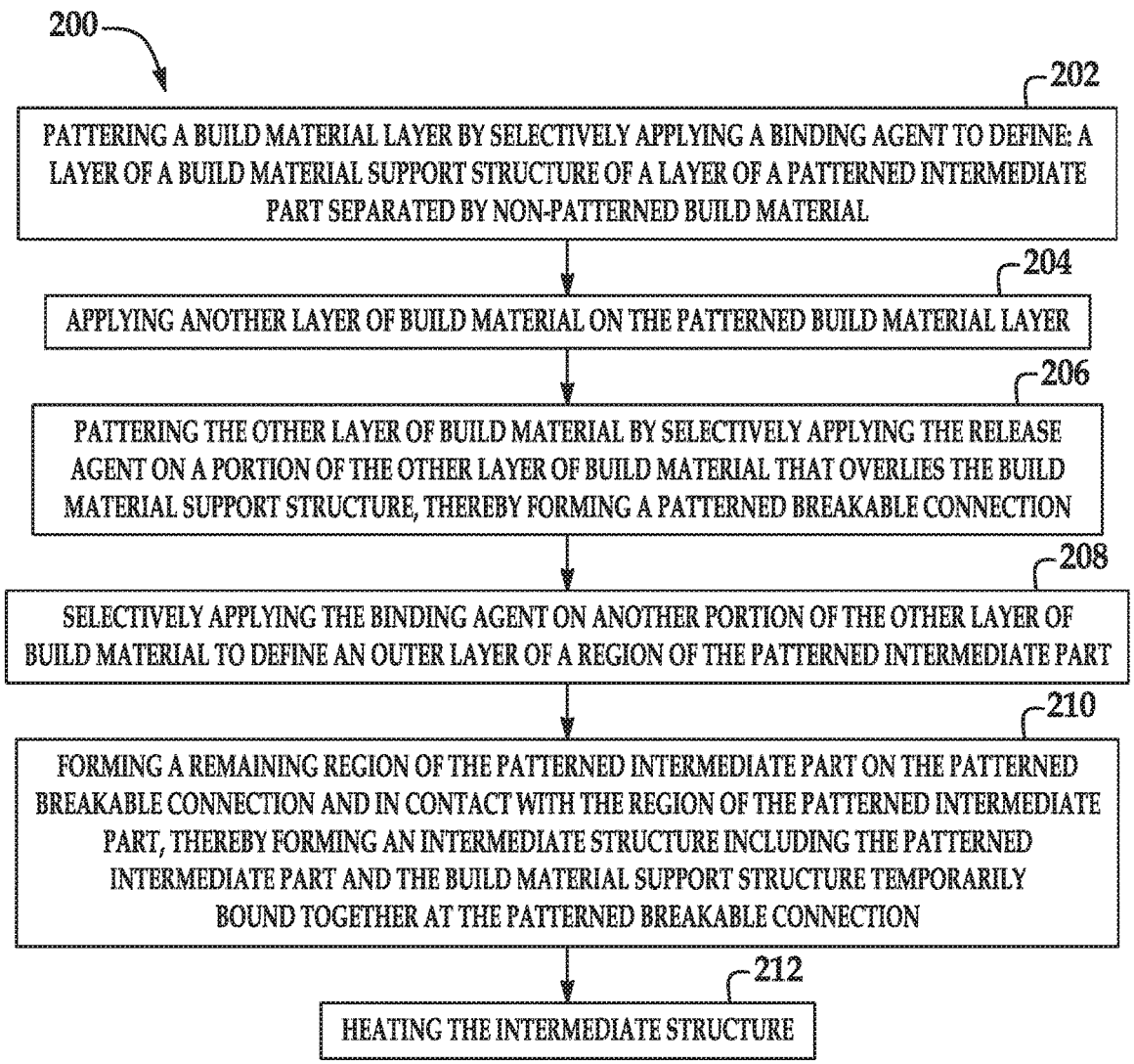
FIG. 3 is a flow diagram illustrating another example of the 3D printing method disclosed herein.

Another, more specific example of the 3D printing method, shown at reference numeral 200, is depicted in FIG. 3. Generally, the method 200 includes patterning a build material layer by selectively applying a binding agent to define: a layer of a build material support structure and a layer of a patterned intermediate part separated by non-patterned build material (reference numeral 202); applying another layer of build material on the patterned build material layer (reference numeral 204); patterning the other layer of build material by selectively applying the release agent on a portion of the other layer of build material that overlies the build material support structure, thereby forming a patterned breakable connection (reference numeral 206); selectively applying the binding agent on another portion of the other layer of build material to define an outer layer of a region of the patterned intermediate part (reference numeral 208); forming a remaining region of the patterned intermediate part on the patterned breakable connection and in contact with the region of the patterned intermediate part, thereby forming an intermediate structure including the patterned intermediate part and the build material support structure temporarily bound together at the patterned breakable connection (reference numeral 210); and heating the intermediate structure (reference numeral 212).

Any examples of the build material, the binding agent, and the release agent described herein may be used in the method 200.

It is to be understood that the method 200 shown in FIG. 3 will be discussed in detail in conjunction with FIGS. 4A through 4J, and FIG. 5.

As shown in reference numeral 202, the method 200 includes patterning a build material layer by selectively applying a binding agent to define a layer of a build material support structure and a layer of a patterned intermediate part, where the patterned layers are separated by non-patterned build material. An example of the patterning of the build material layer is shown in cross-section in FIG. 4A. Prior to patterning, build material particles 14 may be applied to form a build material layer 12, and then the layer 12 may be patterned. In the example shown in FIG. 4A, one build material layer 12 including build material particles 14 has been deposited on (i.e., applied to, formed on, etc.) a build area platform 16 and patterned.

Figure 5:
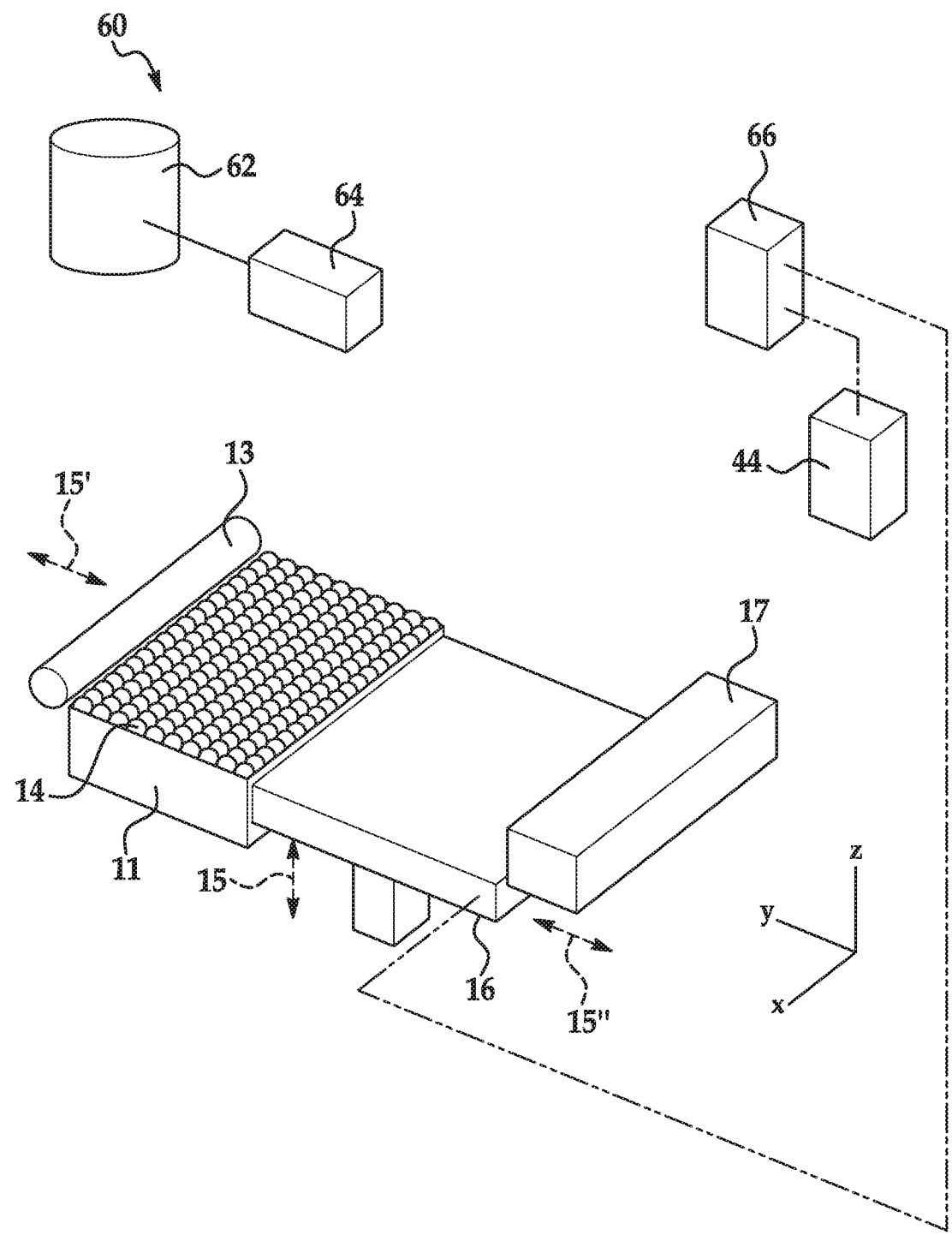
FIG. 5 is a simplified isometric and schematic view of an example of a 3D printing system disclosed herein.

Forming and patterning the build material layer 12 may include the use of a printing system (an example of which is shown at reference numeral 60 in FIG. 5). The printing system 60 may include the build area platform 16, a build material supply 11 containing build material particles 14, a build material distributor 13, and an applicator 17.

The build area platform 16 receives the build material particles 14 from the build material supply 11. The build area platform 16 may be moved in the directions as denoted by the arrow 15 (FIG. 5), e.g., along the z-axis, so that the build material particles 14 may be delivered to the build area platform 16 or to a previously patterned layer (see, e.g., FIG. 4C). In an example, when the build material particles 14 are to be delivered, the build area platform 16 may be programmed to advance (e.g., downward) enough so that the build material distributor 13 can push the build material particles 14 onto the build area platform 16 to form a substantially uniform build material layer 12 thereon. The build area platform 16 may also be returned to its original position, for example, when a new object is to be built.

The build material supply 11 may be a container, bed, or other surface that is to position the build material particles 14 between the build material distributor 13 and the build area platform 16.

The build material distributor 13 may be moved in the directions as denoted by the arrow 15' (FIG. 5), over the build material supply 11 and across the build area platform 16 to spread the build material particles 14 over the build area platform 16. The build material distributor 13 may also be returned to a position adjacent to the build material supply 11 following the spreading of the build material particles 14. The build material distributor 13 may be a blade (e.g., a doctor blade), a roller, a combination of a roller and a blade, and/or any other device capable of spreading the build material 16 over the build area platform 16. For instance, the build material distributor 13 may be a counter-rotating roller. In some examples, the build material supply 11 or a portion of the build material supply 11 may translate along with the build material distributor 13 such that build material particles 14 are delivered continuously to the material distributor 13, rather than being supplied from a single location (as shown in FIG. 5).

Figure 4A:
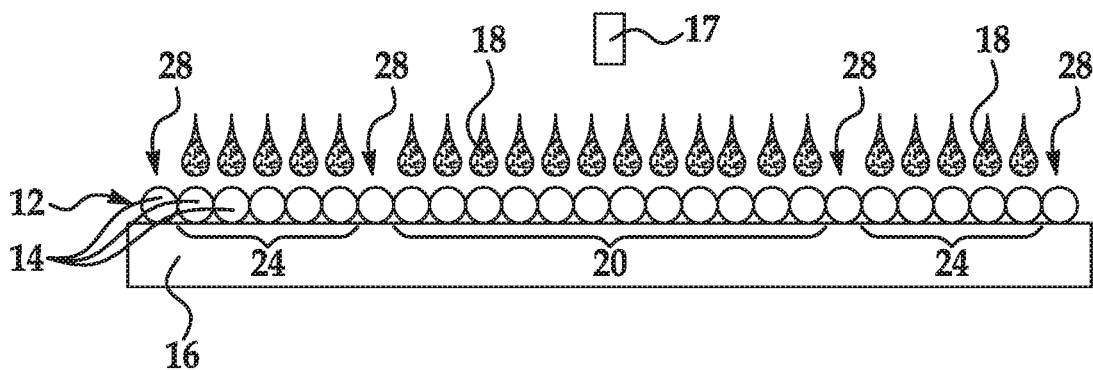
FIGS. 4A through 4J are schematic and partially cross-sectional views depicting the formation of a 3D object and a 3D support structure using an example of the 3D printing method disclosed herein.

A controller (shown as 62 in FIG. 5) may process build material supply data, and in response, may control the build material supply 11 to appropriately position the build material particles 14, and may process spreader data, and in response, may control the build material distributor 13 to spread the supplied build material particles 14 over the build area platform 16 to form the build material layer 12 thereon. As shown in FIG. 4A, one build material layer 12 has been formed. The layers 12, 12A, etc. shown in FIGS. 2A through 2D may be formed in a similar manner.

The build material layer 12 has a substantially uniform thickness across the build area platform 16. In an example, the thickness of the build material layer 12 ranges from about 90 µm to about 110 µm, although thinner or thicker layers may be used. For example, the thickness of the build material layer 12 may range from about 50 µm to about 200 µm. In another example, the thickness of the build material layer 12 ranges from about 30 µm to about 300 µm. In yet another example, the thickness of the build material layer 12 may range from about 20 µm to about 500 µm. The layer 12 thickness may be about 2× (i.e., 2 times) the particle diameter at a minimum for finer part definition. In some examples, the layer 12 thickness may be about 1.2× the particle diameter.

A binding agent 18 is selectively applied to different portions of the build material layer 12 in order to pattern the layer 12. The different portions 20, 24 of the build material layer 12 to which the binding agent 18 is selectively applied may be respectively defined by a 3D model of the support structure that is to be formed and a 3D model of the 3D object that is to be formed. In FIG. 4A, the binding agent 18 is selectively applied to the portion/area 20 of the build material layer 12 to define one patterned layer 22 (shown in FIG. 4B) of a build material support structure 23 (shown in FIG. 4D), and the binding agent 18 is selectively applied to the portion(s)/area(s) 24 of the build material layer 12 to define one patterned layer 26 (shown in FIG. 4B) of a patterned intermediate part 25 (shown in FIG. 4F).

Figure 4B:
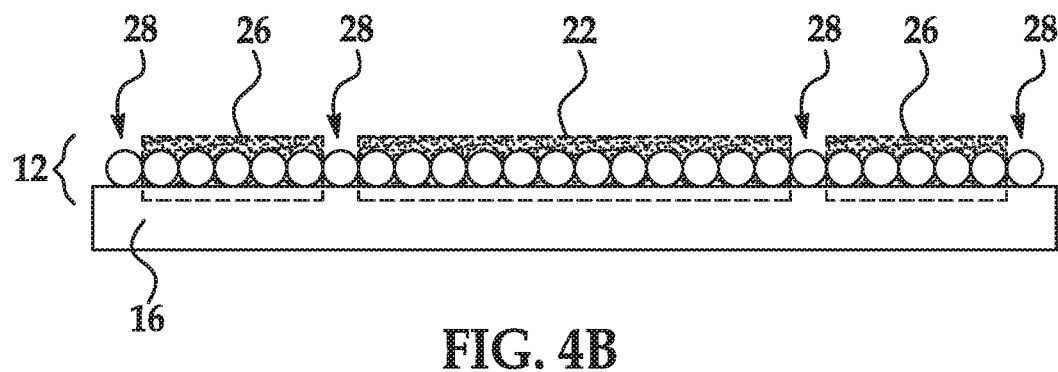

The applicator 17 may be used to selectively apply the binding agent 18. The applicator 17 may include nozzles, fluid slots, and/or fluidics for dispensing the binding agent 18. The applicator 17 may be a thermal inkjet printhead or print bar, a piezoelectric printhead or print bar, or a continuous inkjet printhead or print bar. While a single applicator 17 is shown in FIG. 4B, it is to be understood that multiple applicators 17 may be used.

The applicator 17 may be scanned across the build area platform 16, for example, in the directions as denoted by the arrow 15" in FIG. 5. The applicator 17 may extend a width of the build area platform 16. The applicator 17 may also be scanned along the x-axis, for instance, in configurations in which the applicator 17 does not span the width of the build area platform 16 to enable the applicator 17 to deposit the binding agent 18 over a large area of a build material layer 12. The applicator 17 may thus be attached to a moving XY stage or a translational carriage that moves the applicator 17 adjacent to the build area platform 16 in order to deposit the binding agent 18 in predetermined areas 20, 24 of the build material layer 12.

The applicator 17 may deliver drops of the binding agent 18 at a resolution ranging from about 300 dots per inch (DPI) to about 1200 DPI. In other examples, the applicator 17 may deliver drops of the binding agent 18 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the applicator 17 is able to deliver variable drop volumes of the binding agent 18. One example of a suitable printhead has 600 DPI resolution and can deliver drop volumes ranging from about 6 pl to about 14 pl.

The binding agent 18 is deposited interstitially in the openings or voids between the build material particles 14. Capillary flow can move the binding agent 18 between the individual build material particles 14 in the areas 20, 24.

In this example, it is desirable for the patterned layers 22, 26 to be separated by non-patterned build material 28, (i.e., particles 14 without any binding agent 18 applied thereto) so that the layers 22, 26 are not in direct contact with one another. The non-patterned build material 28 is not intended to be used in forming the build material support structure 23 or the patterned intermediate part 25. In this example, as shown in FIGS. 4A and 4B, some of the non-patterned build material 28 is located at the outer edges of the patterned layer 26 of the patterned intermediate part 25. The build material particles 14 that are directly adjacent to the edges of the build area platform 16 may be exposed to a different environment (a metal wall, air, etc.) than the build material particles 14 that are surrounded by other build material particles 14. The different environment can lead to non-uniformity at the edges. As such, it may be desirable to have non-patterned build material 28 at the outer edges of the patterned layer 26.

Referring specifically now to FIG. 4B, the selective application of the binding agent 18 onto the build material particles 14 within the area 24 results in the formation of a patterned layer 26, which is to become part of a patterned intermediate part 25 (FIG. 4F), which is ultimately to be sintered to form the 3D object/part. More particularly, in the example shown in FIG. 4B, the patterned layer 26 is the first layer of the 3D object being formed. Similarly, as shown in FIG. 4B, the selective application of the binding agent 18 onto the build material particles 14 within the area 20 results in the formation of a patterned layer 22, which is to become part of the build material support structure 23 (FIG. 4D). More particularly, in the example shown in FIG. 4B, the patterned layer 22 is the first layer of the build material support structure 23 being formed.

In examples of the method 200 where the build material support structure 23 is a single layer, the method 200 may continue with reference numerals 204 and 206 of FIG. 3. In other examples, the build material support structure 23 (FIG. 3D) is a multi-layer structure, and thus the method 200 may further include iteratively applying additional build material layers (e.g., 12A, 12B, 12C, shown in FIG. 4C) and selectively applying the binding agent 18 to the additional build material layers 12A, 12B, 12C to define several layers of the build material support structure 23 and several layers of a region 27 of the patterned intermediate part 25, wherein the several layers of the build material support structure 23 and the several layers of the region 27 of the patterned intermediate part 25 are separated by additional non-patterned build material 28.

Figure 4C:
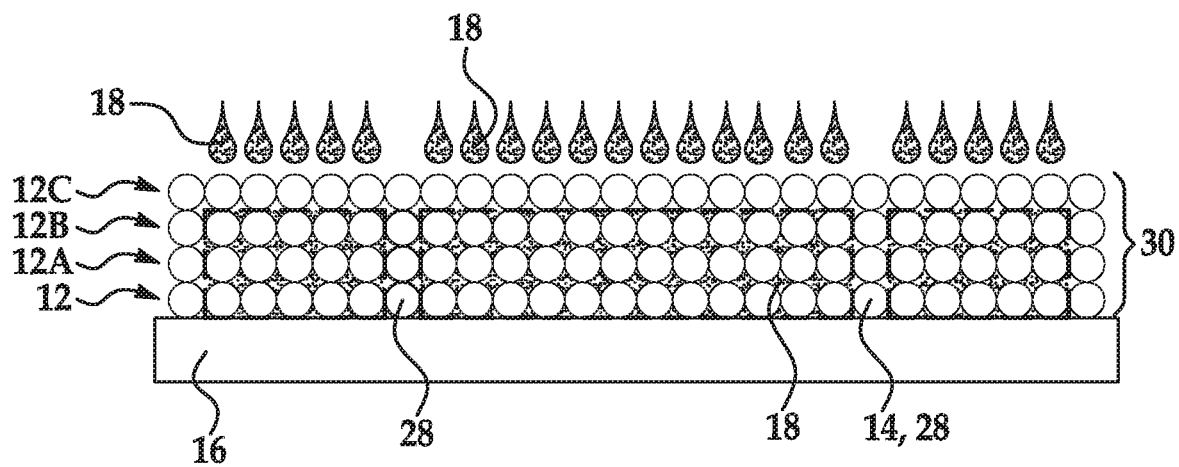
Figure 4D:
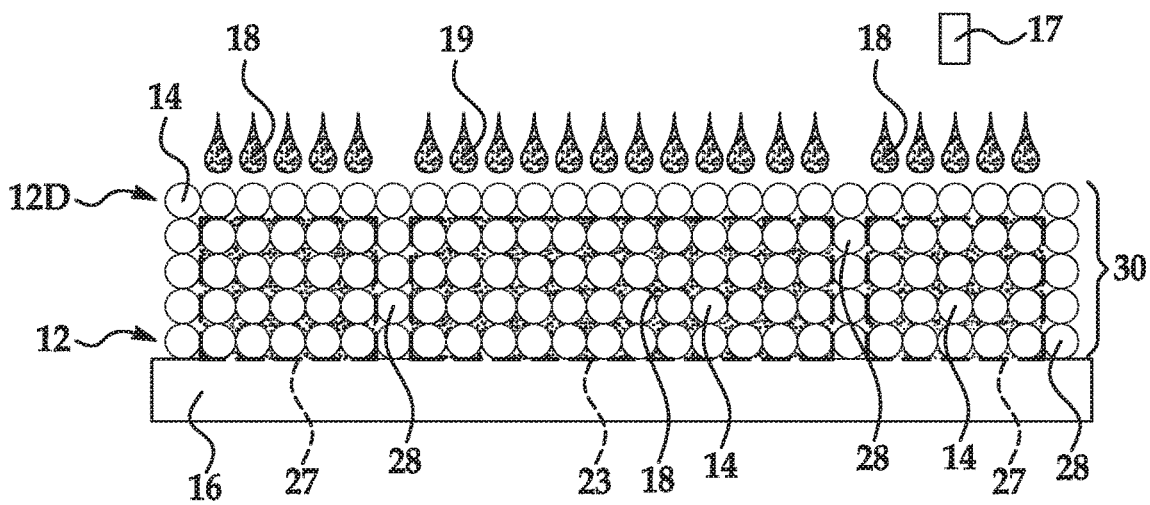

FIG. 4C depicts the repeated application of build material particles 14 to form the other build material layers 12A, 12B, 12C and the repeated patterning of these additional build material layers 12A, 12B, 12C over the first layer 12 of patterned build material. As mentioned above and as shown in FIG. 4D, repeated application and patterning may be performed to iteratively build additional layers of the build material support structure 23, as well as additional layers of the region 27 of the patterned intermediate part 25. Repeated application and patterning may be performed until the total number of build material layers 30 that are patterned form a complete build material support structure 23 according to a 3D object model of a 3D support structure 48 (FIG. 4I). As such, the total number of build material layers 30 that are patterned will depend on the desired dimensions of the build material support structure 23 and the ultimately formed 3D support structure 48. In the example depicted in FIGS. 4C and 4D, four build material layers 12, 12A, 12B, 12C are applied and patterned to form the complete build material support structure 23.

Figure 4E:
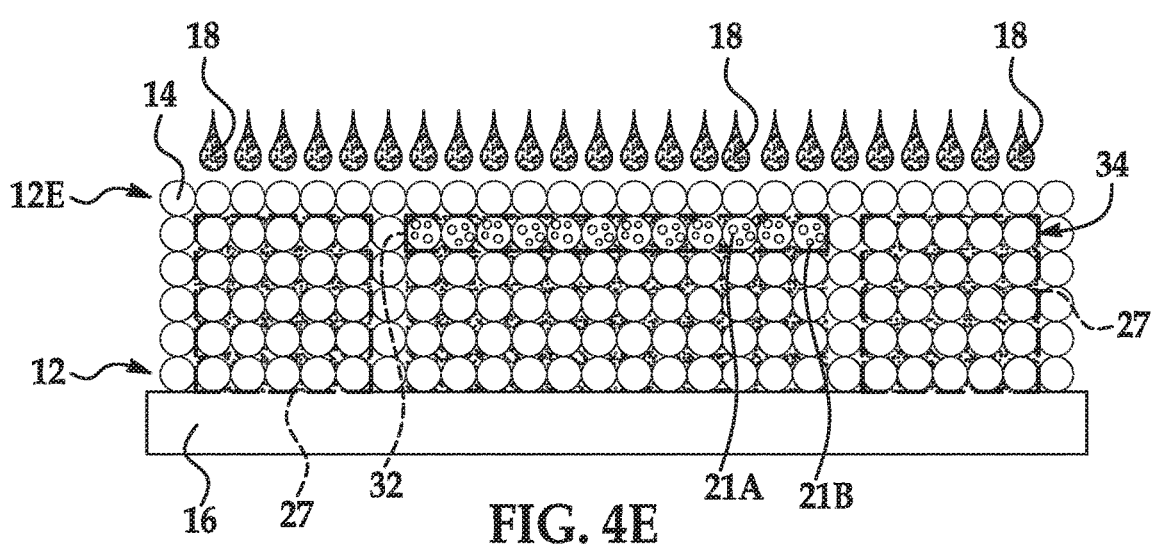

As shown in reference numerals 204, 206, and 208 of FIG. 3 and in FIGS. 4D and 4E, after the desired total number of build material layers 30 are patterned to form the build material support structure 23, the method 200 continues by applying another layer of build material 12D (reference numeral 204), and patterning this other build material layer 12D. Patterning the layer 12D may be accomplished by selectively applying the release agent 19 (including the white colorant 21A and the boehmite 21B) on a portion of the other layer 12D of build material that overlies the build material support structure 23, thereby forming a patterned breakable connection 32 (reference numeral 206); and selectively applying the binding agent 18 on another portion of the other layer 12D of build material to define an outer layer 34 of the region 27 of the patterned intermediate part 25 (reference numeral 208).

Any example of the release agent 19, including both the white colorant 21A and the boehmite 21B, may be used to define the patterned breakable connection 32. The binder (not shown) of the release agent 19 can temporarily bind the build material particles 14, and the white colorant 21A and boehmite 21B of the release agent 19 can remain within the irreversibly breakable connection 38 (FIG. 4I) that is formed during sintering so as to prevent the build material particles 14 in the patterned breakable connection 32 from coalescing.

The release agent 19 may be dispensed from an applicator that is similar to applicator 17 (i.e., may be a thermal inkjet printhead, a piezoelectric printhead, etc.), and that may be operated in the same manner as previously described herein for the applicator 17. In these examples, the applicator may be programmed to receive commands from the controller 62 and to deposit the release agent 19 according to a 3D object model of the irreversibly breakable connection 38. In the example shown in FIG. 4D, the applicator applies the agent 19 to the build material particles 14 of the layer 12D which overly the build material support structure 23. This defines the patterned breakable connection 32 on a surface of the build material support structure 23. The release agent 19 is deposited interstitially in the openings or voids between the build material particles 14. Capillary flow can move the release agent 19 between the individual build material particles 14 in the layer 12D.

Also in the example shown in FIG. 4D, the applicator 17 selectively applies the binding agent 18 on those portion(s) of the build material layer 12D in order to define the outer layer 34 of the region 27 of the patterned intermediate part 25. In these examples, the applicator 17 may be programmed to receive commands from the controller 62 and to deposit the binding agent 18 according to a 3D object model of the 3D object being formed.

Figure 4F:
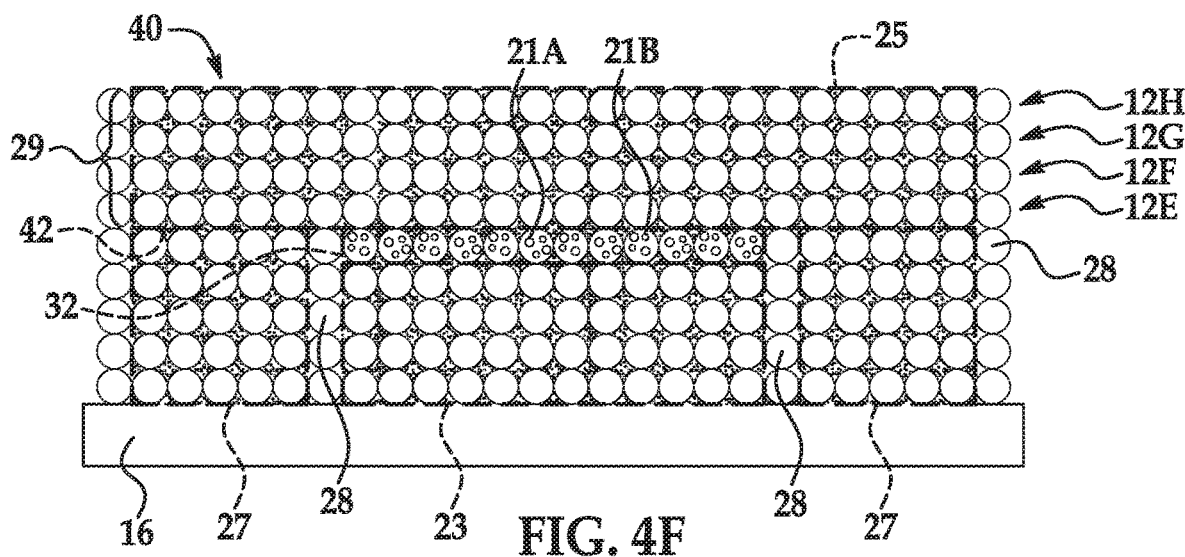

As shown at reference numeral 210 in FIG. 3 and in FIGS. 4E and 4F, the method 200 further includes forming a remaining region 29 of the patterned intermediate part 25 on the patterned breakable connection 32 and in contact with the (previously patterned) region 27 of the patterned intermediate part 25, thereby forming an intermediate structure 40 including the patterned intermediate part 25 and the build material support structure 23, temporarily bound together at the patterned breakable connection 32. The remaining region 29 of the patterned intermediate part 25 is formed by applying a further layer 12E of build material on the patterned breakable connection 32 and the outer layer 34 of the region 27 of the patterned intermediate part 25, and selectively applying the binding agent 18 to the further layer 12E to define a patterned layer 42 of the remaining region 29 of the patterned intermediate part 25. This patterned layer 42 of the remaining region 29 is in direct contact with at least some of the region 27, so that the two regions 27, 29 can be sintered together to form the 3D object. Moreover, this patterned layer 42 of the remaining region 29 overlies the patterned breakable connection 32 and the support structure 23, both of which provide physical support to the patterned layer 42 and any other layers applied and patterned to form the remaining region 29.

In examples of the method 200 where the remaining region 29 is a single layer, the method 200 may continue with reference numeral 212 of FIG. 3. In other examples, the remaining region 29 (FIG. 4F) is a multi-layer structure, and thus the method 100 may further include iteratively applying additional build material layers (e.g., 12E, 12F, 12G, 12H shown in FIG. 4F) and selectively applying the binding agent 18 to the additional build material layers 12E, 12F, 12G, 12H to define several layers of the remaining region 29 of the patterned intermediate part 25.

After the layer(s) 12E, 12F, 12G, 12H of the remaining region 29 are patterned, the intermediate structure 40 is formed. The intermediate structure 40 is similar to intermediate structures 40, 40A, 40B, 40C, or 40D, in that each of the structures 40, 40A, 40B, 40C, 40D includes the patterned intermediate part 25, the build material support structure 23, and the patterned breakable connection 32 which temporarily binds the patterned intermediate part 25 and the build material support structure 23. As such, the following discussion of evaporation and heating may be applicable for both methods 100 and 200, and for any intermediate structure 40, 40A, 40B, 40C, 40D that may be formed.

In any of the examples disclosed herein, the intermediate structure 40, 40A, 40B, 40C, 40D may be part of a build material cake including the intermediate structure 40, 40A, 40B, 40C, 40D and any non-patterned build material 28. In the example shown in FIG. 4F, the non-patterned build material 28 may be positioned between surfaces of the patterned intermediate part 25 and surfaces of the build material support structure 23 and/or surrounding the patterned intermediate part 25.

Figure 4G:
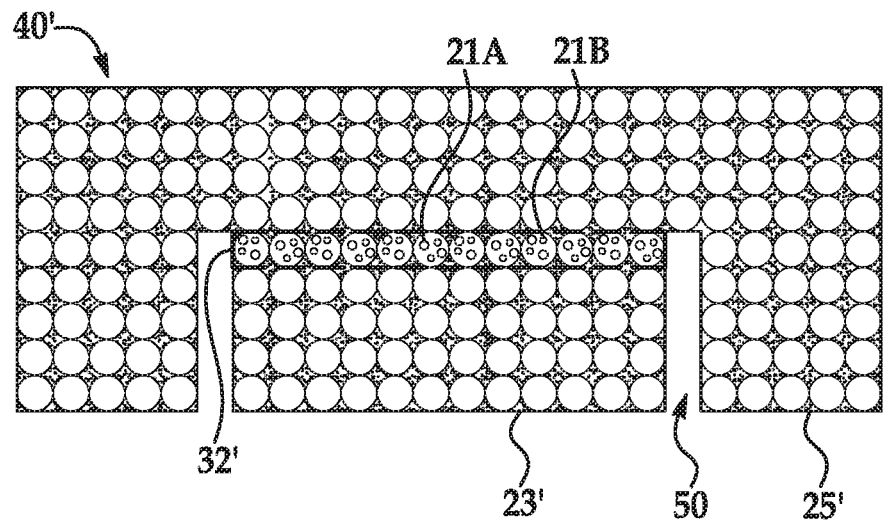

During and/or after the formation of the intermediate structure 40, 40A, 40B, 40C, 40D, the liquid components of the binding agent 18, and the release agent 19 may be at least substantially evaporated to form a densified intermediate part 25', a densified build material support structure 23', and a densified patterned breakable connection 23' (which together make up the densified intermediate structure 40' shown in FIG. 4G). In some examples, the liquid components (e.g., water, solvents) may be substantially evaporated during the layer by layer patterning process and/or while the intermediate structure 40' is on the build area platform, and thus a post excavation baking process may not be used. In these examples, additional heating may be used in order to remove water and solvents, which may activate the binders to generate a densified intermediate structure 40'. In other examples, enough of the liquid components may be evaporated in the layer by layer patterning process and/or while the intermediate structure 40' is on the build area platform to render the structure 40' handleable, and then a post excavation baking process may be used to remove additional solvent and activate the binders to generate the densified intermediate structure 40'.

It is to be understood that at least substantial evaporation of the liquid components may be partial evaporation or complete evaporation. At least substantial evaporation may be partial evaporation when the presence of residual liquid components does not deleteriously affect the desired structural integrity of the intermediate structure 40 or the final 3D object that is being formed. As an example, the densified intermediate part 25' formed by the at least substantial evaporation of the liquid components of the agents 18, 19 may contain a residual amount of the agents 18, 19, but the agents 18, 19 are completely removed during subsequent heating, except for the white colorant 21A and the boehmite 21B of the release agent 19.

As mentioned, at least substantial evaporation of the liquid components (e.g., water and solvents) activates the binders in the binding agent 18 and the release agent 19. For example, accelerated evaporation and binder activation may occur when heating to a glass transition temperature or a minimum film formation temperature of the binders. When activated, the binders coalesce and forms a polymer glue that coats and binds together the build material particles 14 patterned with the binding agent 18, and those patterned with the release agent 19. At least substantial evaporation of the liquid components also may result in the densification of the patterned build material particles 14 through capillary compaction. As such, at least substantial evaporation forms the densified intermediate structure 40', shown in FIG. 4G.

In an example when an acrylic latex is used as the binder, a first solvent of the binding agent 18 and the release agent 19 may evaporate and allow a second solvent of the binding agent 18 and the release agent 19 to come into contact with and soften the acrylic latex particles. Then, as the second solvent evaporates, the softened acrylic latex particles may merge or coalesce to form the continuous network or film to bind the patterned volumes of build material particles 14 into, for example, a densified intermediate part 25', a densified build material support structure 23', and a densified patterned breakable connection 32' (which together make up the densified intermediate structure 40' shown in FIG. 4G).

The liquid components may be volatile enough to evaporate at ambient temperature, or the densification/evaporation temperature may be above ambient temperature. As used therein, "ambient temperature" may refer to room temperature (e.g., ranging about 18° C. to about 22° C.), or to the temperature of the environment in which the 3D printing method is performed (e.g., the temperature of the build area platform 16 during the forming and patterning of new layers). The temperature of the environment in which the 3D printing method is performed (e.g., the temperature of the build area platform 16 during the forming and patterning of new layers) is about 5° C. to about 50° C. below the boiling point of the agents 18 and 19. In an example, the temperature of the build area platform 16 during the forming and patterning of new layers ranges from about 50° C. to about 95° C. Other examples of the 3D printing environment temperature may range from about 40° C. to about 65° C. The densification/evaporation temperature may also be below a temperature at which the binder would be damaged (i.e., be unable to bind). For a majority of suitable binders, the upper limit of the densification/evaporation temperature ranges from about 180° C. to about 220° C. Above this temperature threshold, the binder would chemically degrade into volatile species and leave the patterned components 23, 25, 32, and thus would stop performing their function. For some agents 18, 19, the densification/evaporation temperature ranges from about 50° C. to about 220° C. As still another example, the densification/evaporation temperature may range from about 70° C. to about 90° C.

During evaporation, the white colorant 21A and the boehmite particles 21B (in the patterned breakable connection 32) can collect across the surfaces of the build material particles 14 in the patterned breakable connection 32.

In some examples of the method 100 or 200, the binding agent 18 and the release agent 19 may be allowed to evaporate without heating. For example, more volatile solvents can evaporate in seconds at ambient temperature. In these examples, the build material cake is not exposed to heat or radiation to generate heat, and the water and/or solvent(s) in the binding agent 18 and the release agent 19 evaporate(s) over time. In an example, the water and/or solvent(s) in the binding agent 18 and the release agent 19 may evaporate without heating within a time period ranging from about 1 second to about 1 minute.

In other examples of the method 100 or 200, the intermediate structure 40, 40A, 40B, 40C, 40D may be heated to an evaporation temperature at a rate of about 1° C./minute to about 10° C./minute, although it is contemplated that a slower or faster heating rate may be used. The heating rate may depend, in part, on one or more of:

the agents 18, 19 used, the size (i.e., thickness and/or area (across the x-y plane)) of the layers, and/or the characteristics of the structure 40, 40A, 40B, 40C, 40D (e.g., size, wall thickness, etc.). In an example, intermediate structure 40, 40A, 40B, 40C, 40D is heated to the densification/evaporation temperature at a rate of about 2.25° C./minute.

At least substantially evaporating (with or without heating) activates the binders, and the activated binders provide enough adhesive strength to hold the densified intermediate structure 40' together with enough mechanical stability to survive removal from the build material cake. As such, the densified intermediate structure 40' exhibits handleable mechanical durability, and is capable of being separated from the non-patterned build material 28. FIG. 4G depicts the densified intermediate structure 40' after the non-patterned build material 18 has been removed. As illustrated, the white colorant 21A and the boehmite 21B remain distributed throughout the build material particles 14 in the densified patterned breakable connection 32'.

If after excavation from the build area platform 16, the densified intermediate structure 40' still contains an undesirable amount of less-volatile solvent(s), the post-excavation baking may be performed at a temperature that will evaporate these solvent(s).

While not shown, it is to be understood that the intermediate structures 40A, 40B, 40C, 40D may be densified in a similar manner.

The densified intermediate structure 40' may be extracted from the build material cake or separated from the non-patterned build material 28 by any suitable means. In an example, the densified intermediate structure 40' may be extracted by lifting the densified intermediate structure 40' from the non-patterned build material 28. Any suitable extraction tool may be used. In some examples, the densified intermediate structure 40' may be cleaned to remove non-patterned build material 28 from its surface. In an example, the densified intermediate structure 40' may be cleaned with a brush and/or an air jet, may be exposed to mechanical shaking, or may be exposed to other techniques that can remove the non-patterned build material 28. As shown in FIG. 4G, removal of the non-patterned build material 28 can expose outer edges of the densified intermediate structure 40' and any spaces 50 between the densified build material support structure 23' and portions of the densified patterned intermediate part 25' that had been occupied by the non-patterned build material 28 during the printing process.

Figure 4H:
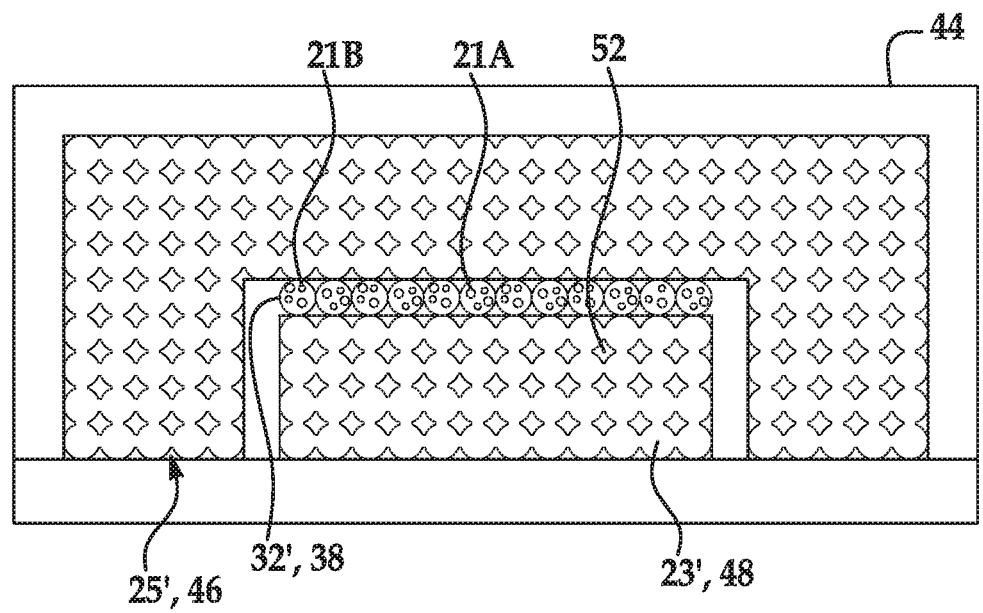
Figure 4I:
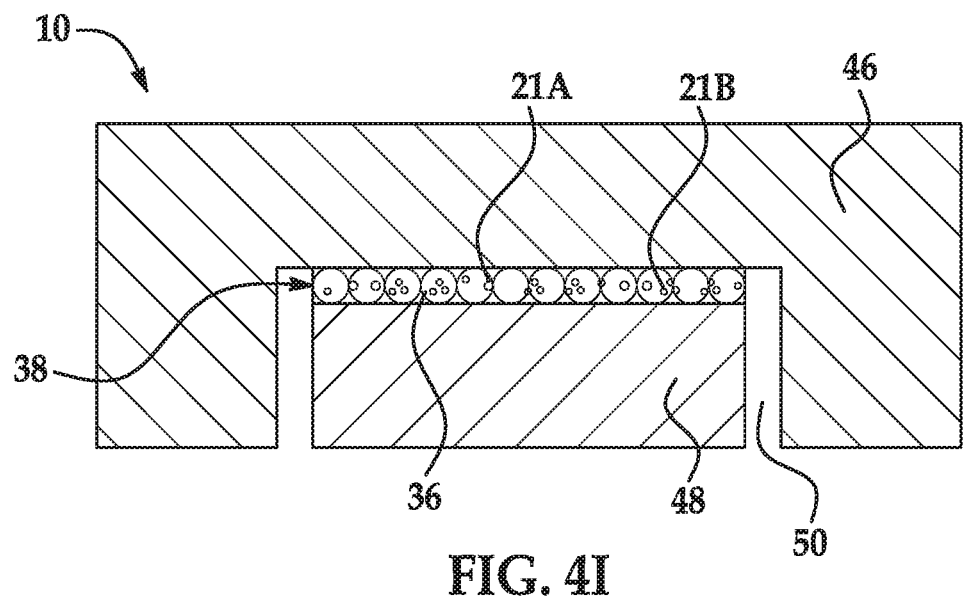

When the densified intermediate structure 40' is extracted from the build material cake and/or cleaned of the non-patterned build material 28, the densified intermediate structure 40' may be removed from the build area platform 16 and placed in a heating mechanism 44 (as shown in FIG. 4H).

The densified patterned breakable connection 32' may appear white, or some other non-white color when the release agent 19 includes a non-white colorant. The visual appearance of the densified patterned breakable connection 32' may be helpful to remind an operator of where the irreversibly breakable connection will be formed.

The heating mechanism 44 may be used to perform a heating sequence, which involves exposing the intermediate structure 40' (or the densified version of the intermediate structures 40A, 40B, 40C, or 40D) to a temperature that forms the 3D particle article 10, as shown in FIG. 4I. In some examples, heating involves exposure to a series of temperatures that form a 3D object 46 from the patterned intermediate part 25, 25', a 3D support structure 48 from the build material support structure 23, 23' and the irreversibly breakable connection 38 from the patterned breakable connection 32, 32', the irreversibly breakable connection 38 including the white colorant 21A and the boehmite particles 21B among non-contiguous metallic build material particles 14", and being positioned between the 3D object 46 and the 3D support structure 48.

The series of temperatures may involve heating the (densified) intermediate structure 40' (or the densified version of the intermediate structures 40A, 40B, 40C, or 40D) to a de-binding temperature, and then to sintering temperature(s). Briefly, the de-binding temperature removes the binders from the densified intermediate structure 40' to produce an at least substantially binder-free intermediate structure, and the at least substantially binder-free intermediate structure may be sintered at the various temperatures to form the final 3D object 46, the irreversibly breakable connection 38, and the 3D support structure 48. Heating to de-bind and heating to sinter may take place at several different temperatures, where the temperature for de-binding is lower than the temperatures for sintering.

Heating to de-bind is accomplished at a thermal decomposition temperature that is sufficient to thermally decompose the binders (from the agents 18 and 19). As such, the temperature for de-binding depends upon the binders in the agents 18, 19 used. In an example, the thermal decomposition temperature ranges from about 250° C. to about 600° C. In another example, the thermal decomposition temperature ranges from about 300° C. to about 550° C. The binders may have a clean thermal decomposition mechanism (e.g., leaves non-volatile residue in an amount <5 wt % of the initial binder, and in some instances non-volatile residue in an amount <1 wt % of the initial binder). The smaller residue percentage (e.g., close to 0%) is more desirable. During the de-binding stage, the binder decomposes first into a liquid phase of lower viscosity. Evaporation of this liquid may initially increase the open porosity in the substantially binder-free intermediate structure.

While not being bound to any theory, it is believed that the at least substantially binder-free intermediate structure may maintain its shape due, for example, to one or more of: i) the low amount of stress experienced by the at least substantially binder-free i part due to it not being physically handled, and/or ii) low level necking occurring between the build material particles 14 at the thermal decomposition temperature of the binder. The at least substantially binder-free intermediate structure may maintain its shape although the binder(s) is/are at least substantially removed and the build material particles 14 are not yet sintered.

The temperature may be raised to begin the initial stages of sintering of the substantially binder-free intermediate structure, which can result in the formation of weak bonds that are strengthened during final sintering. The heating temperature may continue to be raised to finish the stages of sintering. During the final stages of sintering, the build material particles 14 continue to coalesce to form the 3D object 46 and the 3D support structure 48, and so that a desired density of at least the 3D object 46 is achieved.

During sintering, the white colorant 21A and the boehmite particles 21B remain intact, and thus provide a fine particle composite that physically prevents the metallic build material particles 14 in the patterned breakable connection 32, 32' from sintering. While the build material particles 14 in the patterned breakable connection 32, 32' may soften and even melt, the white colorant 21A and the boehmite particles 21B (which do not soften or melt) keeps the particles 14 from sintering together. Rather, the irreversibly breakable connection 38 that is formed includes non-contiguous build material particles 14", and intact white colorant 21A and the boehmite particles 21B among the non-contiguous build material particles 14". FIG. 4H illustrates the intermediate structure 40' during sintering.

The final sintering temperature is a temperature that is sufficient to sinter the remaining build material particles 14 in the patterned intermediate part 25' and the patterned support structure 23', but that does not soften or melt the white colorant 21A or the boehmite particles 21B. Therefore, the sintering temperature is highly depending upon the composition of the build material particles 14, the white colorant 21A, and the boehmite particles 21B. During final sintering, the at least substantially binder-free intermediate structure may be heated to a temperature ranging from about 80% to about 99.9% of the melting point(s) of the build material particles 14. In another example, the at least substantially binder-free intermediate structure may be heated to a temperature ranging from about 90% to about 95% of the melting point(s) of the build material particles 14. In still another example, the at least substantially binder-free intermediate structure may be heated to a temperature ranging from about 60% to about 90% of the melting point(s) of the build material particles 14. In still another example, the final sintering temperature may range from about 10° C. below the melting temperature of the build material particles 14 to about 50° C. below the melting temperature of the build material particles 14. In still another example, the final sintering temperature may range from about 100° C. below the melting temperature of the build material particles 14 to about 200° C. below the melting temperature of the build material particles 14. The final sintering temperature may also depend upon the particle size and time for sintering (i.e., high temperature exposure time). As an example, the sintering temperature may range from about 500° C. to about 1800° C. In another example, the sintering temperature is at least 900° C. An example of a final sintering temperature for bronze is about 850° C., and an example of a final sintering temperature for stainless steel is about 1400° C., and an example of a final sintering temperature for aluminum or aluminum alloys may range from about 550° C. to about 620° C. While these temperatures are provided as final sintering temperature examples, it is to be understood that the final sintering temperature depends upon the build material particles that are utilized, and may be higher or lower than the provided examples. Heating at a suitable final sintering temperature sinters and fuses the build material particles 14 to form a completed 3D object 46, a completed 3D support structure 48, and a completed irreversibly breakable connection, each of which may be even further densified relative to the corresponding components of the at least substantially binder-free intermediate structure. For example, as a result of final sintering, the density may go from 50% density to well over 90%, and in some cases very close to 100% of the theoretical density.

Each of these sintering temperatures is below the melting point of the white colorant 21A (including the pigment and the coating) and the boehmite particles 21B. This means that the white colorant 21A and the boehmite particles 12B remain intact to keep the build material particles 14 in the patterned breakable connection from sintering to form a coalesced and contiguous metal structure.

The length of time at which the heat (for each of de-binding and sintering) is applied and the rate at which the structure is heated may be dependent, for example, on one or more of: characteristics of the heating mechanism 44, characteristics of the binder(s), characteristics of the build material particles (e.g., metal type, particle size, etc.), and/or the characteristics of the 3D object/part 46 (e.g., wall thickness).

The densified intermediate structure 40' (or the densified version of the intermediate structures 40A, 40B, 40C, or 40D) may be heated at the de-binding temperature for a time period ranging from about 10 minutes to about 72 hours. When the structure 40' contains open porosity to vent out binder pyrolysis, and/or the amount of the binder(s) in the densified intermediate structure 40' is low (e.g., from about 0.01 wt % to about 4.0 wt % based on the total weight of the build material particles 14) and/or the wall thickness of the structure 40' is relatively thin, the time period for de-binding may be 3 hours (180 minutes) or less. Longer times may be used if the structure 40' has less open porosity, if the structure 40' has thicker walls, and/or if the structure 40' has a higher concentration of binder. In an example, the de-binding time period is about 60 minutes. In another example, the de-binding time period is about 180 minutes. The densified green/intermediate part may be heated to the de-binding temperature at a rate ranging from about 0.5° C./minute to about 20° C./minute. The heating rate may depend, in part, on one or more of: the amount of the binder(s) in the densified intermediate structure 40', the porosity of the densified intermediate structure 40', and/or the characteristics of the densified intermediate structure 40'.

The at least substantially binder-free intermediate structure may be continuously heated to the final sintering temperature, and then held at the final temperature for a time period ranging from about 20 minutes to about 15 hours. In an example, the sintering time period is 60 minutes. In another example, the sintering time period is 90 minutes. In still another example, the sintering time period is less than or equal to 4 hours (240 minutes). The at least substantially binder-free intermediate structure may be heated up to the final sintering temperature at a rate ranging from about 1° C./minute to about 20° C./minute. In an example, the at least substantially binder-free intermediate structure is heated up to the final sintering temperature at a rate ranging from about 2.5° C./minute to about 10° C./minute.

In a specific example, the at least substantially binder-free intermediate structure is heated to the de-binding temperature at a rate of about 0.5° C./minute and is held at the de-binding temperature for about 180 minutes; and then is heated to the final sintering temperature at a rate of about 2.5° C./minute, is held at the final sintering temperature for about 240 minutes. While several examples have been provided, it is to be understood that various temperature programs for de-binding and sintering may be used.

Heating may take place in an environment/atmosphere that is compatible with the various materials and agents. In an example, heating may take place in a reducing or an inert environment.

An example of the resulting 3D printed article 10 is shown in FIG. 4I. After heating, the 3D printed article 10 may be cooled. It is to be understood that the white colorant 21A and the boehmite particles 21B remain in the irreversibly breakable connection 38 when cooled.

The 3D printed article 10 includes a first object (e.g., the 3D object 46), a second object (e.g., the 3D support structure 48), and the irreversibly breakable connection 38 between the first and second objects 46, 48, wherein the irreversibly breakable connection 38 includes non-contiguous metallic build material particles 14", the white colorant 21A among the non-contiguous metallic build material particles 14" (the white colorant including a white metal oxide pigment coated with an alumina coating), and boehmite particles 21B among the non-contiguous metallic build material particles 14". In an example, the first object is a metal 3D part and the second object is a metal 3D support structure.

The non-contiguous metallic build material particles 14", the white colorant 21A, and the boehmite particles 12B are localized to the irreversibly breakable connection 38, and thus add fragility to the irreversibly breakable connection 38. As such, the irreversibly breakable connection 38 provides a weak junction or a fault line domain between the first object (e.g., the 3D object 46) and the second object (e.g., the 3D support structure 48). As such, the second object (e.g., the 3D support structure 48) can be easily removed from the first object (e.g., the 3D object 46) by breaking the irreversibly breaking connection 38. Breaking may be accomplished with human hands, or with simple tools, such as pliers and/or a vise. Cutting tools may be used, but may not have to be used in order to break the second object (e.g., the 3D support structure 48) from the first object (e.g., the 3D object 46).

In some instances, the irreversibly breakable connection 38 is white, which can aid an operator in determining where to break off the support structure 48. In other instances, the irreversibly breakable connection 38 is a non-white color (i.e., the color of an inorganic pigment that survives sintering), which can also aid an operator in determining where to break off the support structure 48.

Figure 4J:
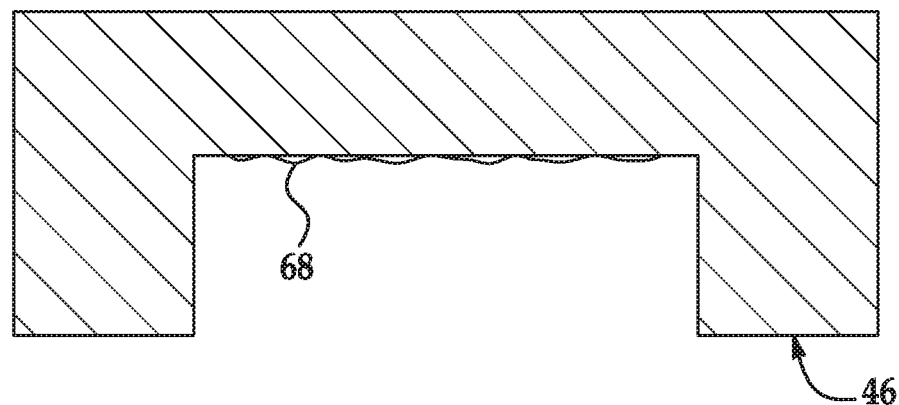

An example of the 3D object 46 after the irreversibly breakable connection 38 has been broken is depicted in FIG. 4J. The break at the irreversibly breakable connection 38 enables the 3D support structure 48 to be separated from the 3D object and removed (and thus it is not shown in FIG. 4J). At most, some remnants 68 of metal pieces, white colorant 21A, and/or boehmite particles 21B from the irreversibly breakable connection 38 may remain attached to the 3D object 46.

Printing System

Referring now to FIG. 5, an example of the 3D printing system 60 that may be used to perform examples of the method 100 disclosed herein is depicted. It is to be understood that the 3D printing system 10 may include additional components (some of which are described herein) and that some of the components described herein may be removed and/or modified. Furthermore, components of the 3D printing system 60 depicted in FIG. 5 may not be drawn to scale and thus, the 3D printing system 60 may have a different size and/or configuration other than as shown therein.

In an example, the three-dimensional (3D) printing system 60, comprises: a supply 11 of build material particles 14; a build material distributor 13; a supply of a binding agent 18 and a supply of a release agent 19; applicator(s) 17 for selectively dispensing the binding agent 18 and the release agent 19; a controller 62; and a non-transitory computer readable medium having stored thereon computer executable instructions to cause the controller 62 to cause the printing system to perform some or all of the method disclosed herein.

As mentioned above, the build area platform 16 receives the build material particles 14 from the build material supply 11. The build area platform 16 may be integrated with the printing system 60 or may be a component that is separately insertable into the printing system 60. For example, the build area platform 16 may be a module that is available separately from the printing system 60. The build area platform 16 that is shown is one example, and could be replaced with another support member, such as a platen, a fabrication/print bed, a glass plate, or another build surface.

While not shown, it is to be understood that the build area platform 16 may also include built-in heater(s) for achieving and maintaining the temperature of the environment in which the 3D printing method is performed.

Also as mentioned above, the build material supply 11 may be a container, bed, or other surface that is to position the build material particles 14 between the build material distributor 13 and the build area platform 16. In some examples, the build material supply 11 may include a surface upon which the build material particles 14 may be supplied, for instance, from a build material source (not shown) located above the build material supply 11. Examples of the build material source may include a hopper, an auger conveyer, or the like. Additionally, or alternatively, the build material supply 11 may include a mechanism (e.g., a delivery piston) to provide, e.g., move, the build material particles 14 from a storage location to a position to be spread onto the build area platform 16 or onto a previously patterned layer. Another example of the mechanism for moving the build material composition 16 is a pneumatic conveying system.

As shown in FIG. 5, the printing system 60 also the build material distributor 18 and the applicator(s) 17, both of which have been described in reference to the method 200.

Each of the previously described physical elements may be operatively connected to the controller 62 of the printing system 60. The controller 62 may process print data that is based on a 3D object model of the 3D object/part 46 and of the 3D support structure 48 to be generated. In response to data processing, the controller 62 may control the operations of the build area platform 16, the build material supply 11, the build material distributor 13, and the applicator(s) 17. As an example, the controller 62 may control actuators (not shown) to control various operations of the 3D printing system 62 components. The controller 60 may be a computing device, a semiconductor-based microprocessor, a central processing unit (CPU), an application specific integrated circuit (ASIC), and/or another hardware device. Although not shown, the controller 62 may be connected to the 3D printing system 60 components via communication lines.

The controller 62 manipulates and transforms data, which may be represented as physical (electronic) quantities within the printer's registers and memories, in order to control the physical elements to create the printed article 10. As such, the controller 62 is depicted as being in communication with a data store 64. The data store 64 may include data pertaining to a 3D object 46, a 3D support structure 48, and an irreversibly breakable connection 38 to be printed by the 3D printing system 60. The data for the selective delivery of the build material 16, the binding agent 18, the release agent 19, etc. may be derived from a model of the components 46, 48 and 38 to be formed. For instance, the data may include the locations on each build material layer 12, etc. that the applicator 17 is to deposit the binding agent 18. In one example, the controller 62 may use the data to control the applicator 17 to selectively apply the binding agent 18. The data store 64 may also include machine readable instructions (stored on a non-transitory computer readable medium) that are to cause the controller 62 to control the amount of build material particles 14 that is supplied by the build material supply 11, the movement of the build area platform 16, the movement of the build material distributor 13, the movement of the applicator 17, etc.

As shown in FIG. 5, the printing system 60 also includes the heating mechanism 44. Examples of the heating mechanism 44 include a conventional furnace or oven, a microwave, or devices capable of hybrid heating (i.e., conventional heating and microwave heating). As shown in FIG. 5, the heating mechanism 44 may be a module that is available separately from the printing system 60. In other examples, the heating mechanism 44 may be integrated with the printing system 60.

The heating mechanism 44 and/or the heater(s) in the build area platform 16 may be operatively connected to a driver, an input/output temperature controller, and temperature sensors, which are collectively shown as heating system components 66. The heating system components 66 may operate together to control the heating mechanism 44 and/or the heater(s) in the build area platform 16. The temperature recipe (e.g., heating exposure rates and times) may be submitted to the input/output temperature controller. During heating, the temperature sensors may sense the temperature of the build material particles 14 on the platform 16 or in the intermediate structure 40, 40', and the temperature measurements may be transmitted to the input/output temperature controller. For example, a thermometer associated with the heated area can provide temperature feedback. The input/ output temperature controller may adjust the heating mechanism 44 and/or the heater(s) in the build area platform 16 power set points based on any difference between the recipe and the real-time measurements. These power set points are sent to the drivers, which transmit appropriate voltages to the heating mechanism 44 and/or the heater(s) in the build area platform 16. This is one example of the heating system components 66, and it is to be understood that other heat control systems may be used. For example, the controller 62 may be configured to control the heating mechanism 44 and/or the heater(s) in the build area platform 16.

It is to be understood that the ranges provided herein include the stated range and any value or sub-range within the stated range, as if the value(s) or sub-range(s) within the stated range were explicitly recited. For example, from about 500° C. to about 1800° C. should be interpreted to include not only the explicitly recited limits of from about 500° C. to about 1800° C., but also to include individual values, such as about 690° C., 1000.5° C., 1555° C., 1685° C., etc., and sub-ranges, such as from about 900° C. to about 1625° C., from about 525° C. to about 1500° C., from about 1020° C. to about 1420° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
    patterning build material layers to form an intermediate structure, the patterning including:
        selectively applying a binding agent, including a first binder, to define: a build material support structure and a patterned intermediate part; and
        selectively applying a release agent to define a patterned breakable connection between at least a portion of the build material support structure and at least a portion of the patterned intermediate part, the release agent including:
            a white colorant including a white metal oxide pigment coated with a coating selected from the group consisting of alumina, silica, and combinations thereof;
            boehmite particles having a particle size that is smaller than a particle size of the white metal oxide pigment;
            a second binder; and
            an aqueous vehicle; and
    heating the intermediate structure to form an irreversibly breakable connection at the patterned breakable connection.

2. The method as defined in claim 1 wherein the heating involves exposure to a series of temperatures that form:
    a 3D object from the patterned intermediate part;
    a 3D support structure from the build material support structure; and
    the irreversibly breakable connection from the patterned breakable connection, the irreversibly breakable connection including the white colorant and the boehmite particles among non-contiguous metallic build material particles and being positioned between the 3D object and the 3D support structure.

3. The method as defined in claim 2, further comprising removing the 3D support structure from the 3D object by breaking the irreversibly breakable connection.

4. The method as defined in claim 1 wherein the patterned intermediate part at least partially overlies the build material support structure.

5. The method as defined in claim 1 wherein:
    the white colorant is present in an amount ranging from about 5 wt % to about 20 wt % of a total weight of the release agent;
    the boehmite particles are present in an amount ranging from about 0.1 wt % to about 1 wt % of the total weight of the release agent; and
    the second binder is present in an amount ranging from about 5 wt % to about 14 wt % of the total weight of the release agent.

6. The method as defined in claim 1 wherein:
    the particle size of the white metal oxide pigment ranges from about 100 nm to about 600 nm; and
    the particle size of the boehmite particles ranges from about 10 nm to less than 200 nm.

7. The method as defined in claim 1 wherein patterning the build material layers includes:
    patterning a first build material layer by selectively applying the binding agent to define: a layer of the build material support structure and a layer of the patterned intermediate part separated by non-patterned build material;
    applying an other layer of build material on the patterned first build material layer;
    patterning the other layer of build material by:
        selectively applying the release agent on a portion of the other layer of build material that overlies the build material support structure, thereby forming the patterned breakable connection; and
        selectively applying the binding agent on an other portion of the other layer of build material to define an outer layer of a region of the patterned intermediate part; and
    forming a remaining region of the patterned intermediate part on the patterned breakable connection and in contact with the region of the patterned intermediate part, thereby forming the intermediate structure including the patterned intermediate part and the build material support structure temporarily bound together at the patterned breakable connection.

8. The method as defined in claim 7 wherein the build material support structure is a multi-layer structure, and wherein prior to patterning the other layer of build material the method further comprises iteratively applying additional build material layers and selectively applying the binding agent to the additional build material layers to define several layers of the build material support structure and several layers of the region of the patterned intermediate part, wherein the several layers of the build material support structure and the several layers of the region of the patterned intermediate part are separated by additional non-patterned build material.

9. The method as defined in claim 7 wherein the forming of the remaining region of the patterned intermediate part includes:

applying a further layer of build material on the patterned breakable connection and the outer layer of the region of the patterned intermediate part; and selectively applying the binding agent to the further layer to define a patterned layer of the remaining region of the patterned intermediate part.

10. The method as defined in claim 1 wherein patterning the build material layers includes:

iteratively applying individual build material layers;

selectively applying the binding agent to each of the individual build material layers to define several layers of the build material support structure and several layers of the patterned intermediate part; and selectively applying the release agent on each of the individual build material layers to define the patterned breakable connection between the several layers of the build material support structure and the several layers of the patterned intermediate part.

* * * * *